US011528197B1

(12) United States Patent
Youssef et al.

(10) Patent No.: US 11,528,197 B1
(45) Date of Patent: Dec. 13, 2022

(54) REQUEST FACILITATION FOR APPROACHING CONSENSUS FOR A SERVICE TRANSACTION

(71) Applicant: International Business Machines Corporation, Armonk, NY (US)

(72) Inventors: Alaa S. Youssef, Valhalla, NY (US); Jim Alain Laredo, Katonah, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/394,119

(22) Filed: Aug. 4, 2021

(51) Int. Cl.
| G06F 15/16 | (2006.01) |
| H04L 41/5041 | (2022.01) |
| H04L 41/5061 | (2022.01) |
| H04L 41/5019 | (2022.01) |
| G06F 15/173 | (2006.01) |

(52) U.S. Cl.
CPC ...... *H04L 41/5048* (2013.01); *H04L 41/5019* (2013.01); *H04L 41/5061* (2013.01)

(58) Field of Classification Search
CPC ............. H04L 41/5048; H04L 41/5019; H04L 41/5061
USPC ......................................................... 709/231
See application file for complete search history.

(56) References Cited

U.S. PATENT DOCUMENTS

| 7,257,605 B2 | 8/2007 | Murthy |
| 7,478,400 B1 | 1/2009 | Banerjee et al. |
| 8,380,679 B2 | 2/2013 | Majumdar et al. |
| 8,838,534 B2 | 9/2014 | Fowler |
| 10,025,346 B2 | 7/2018 | Brown |
| 10,235,440 B2 | 3/2019 | Lee et al. |

(Continued)

FOREIGN PATENT DOCUMENTS

WO  WO-2021102572 A1 * 6/2021 ......... G06F 16/9024

OTHER PUBLICATIONS

"Two-phase commit protocol," Wikipedia, https://en.wikipedia.org/wiki/Two-phase_commit_protocol, accessed Jul. 21, 2021, 7 pages.

(Continued)

*Primary Examiner* — Karen C Tang
(74) *Attorney, Agent, or Firm* — Amin, Turocy & Watson, LLP

(57) ABSTRACT

One or more systems, computer-implemented methods, and computer program products to facilitate a process for consensus regarding proceeding with a request of a transaction are provided. A system can comprise a memory that stores computer executable components and a processor that executes the computer executable components stored in the memory. The computer executable components can comprise a services component that operates a service of a transaction, where the services component approaches consensus regarding a request of the transaction by communicating with one or more other services components that operate one or more other services immediately upstream or downstream in the transaction to the service. The services component can approach the consensus by communicating only with the one or more other services components. To approach the consensus, the services component can communicate one or more messages that include one or more requests, votes or final decisions.

20 Claims, 16 Drawing Sheets

(56) References Cited

U.S. PATENT DOCUMENTS

| | | |
|---|---|---|
| 10,296,371 B2 | 5/2019 | Guerin et al. |
| 10,666,496 B2 | 5/2020 | Cheng et al. |
| 2012/0166407 A1 | 6/2012 | Lee et al. |
| 2015/0254273 A1 | 9/2015 | Larson et al. |
| 2017/0083562 A1 | 3/2017 | Guney et al. |
| 2017/0374145 A1 | 12/2017 | Chrysanthakopoulos et al. |
| 2018/0219946 A1 | 8/2018 | Moghaddam et al. |
| 2020/0034373 A1 | 1/2020 | Lee et al. |
| 2020/0374106 A1* | 11/2020 | Padmanabhan ..... H04L 63/0428 |
| 2020/0394159 A1* | 12/2020 | Hurley ................. H04L 63/123 |
| 2020/0394648 A1* | 12/2020 | Blackshear ........ G06Q 20/3829 |
| 2021/0099313 A1* | 4/2021 | Kondrashov ........... G06F 21/64 |
| 2021/0182423 A1* | 6/2021 | Padmanabhan ......... G06F 21/64 |
| 2021/0226774 A1* | 7/2021 | Padmanabhan ....... G06F 16/907 |
| 2021/0243193 A1* | 8/2021 | Padmanabhan ....... G06F 16/248 |
| 2021/0319436 A1* | 10/2021 | Ow ................... G06Q 20/0658 |

OTHER PUBLICATIONS

Mell et al., "The NIST Definition of Cloud Computing," Recommendations of the National Institute of Standards and Technology, NIST Special Publication 800-145, Sep. 2011, 7 pages.

\* cited by examiner

REQUEST FACILITATION FOR APPROACHING CONSENSUS FOR A SERVICE TRANSACTION

BACKGROUND

One or more embodiments described herein relate to reaching consensus for a request of a transaction, and more specifically to facilitating reaching consensus regarding proceeding with a request of the transaction via employing a decentralized protocol.

Today, many computing applications, such as cloud-native computing applications, do not exhibit monolithic architectures. Instead, such computing applications can exhibit distributed architectures that can include large numbers of loosely coupled services components, such as for operating one or more services and/or microservices, where a services component can be a discrete application, such as being containerized, that can perform a discrete service and/or microservice. The loosely coupled services can be appealing due to offering improved scalability, flexibility, maintainability, and accelerated developer productivity as compared to employing monolithic architectures. To facilitate a request to a transaction including one or more of these loosely coupled services, consensus regarding an order to persist or abort the transaction in response to the request can be sought between these one or more services.

SUMMARY

The following presents a summary to provide a basic understanding of one or more embodiments described herein. This summary is not intended to identify key or critical elements, or to delineate any scope of the particular embodiments and/or any scope of the claims. The sole purpose of the summary is to present concepts in a simplified form as a prelude to the more detailed description that is presented later. In one or more embodiments described herein, devices, systems, computer-implemented methods, apparatuses and/or computer program products are described that can facilitate reaching consensus regarding proceeding with a request of a transaction including one or more services.

According to an embodiment, a system can comprise a processor that executes computer executable components stored in memory, where the computer executable components comprise a services component that operates a service of a transaction, where the services component approaches consensus regarding a request of the transaction by communicating with one or more other services components that operate one or more other services immediately upstream or downstream in the transaction to the service.

According to another embodiment, a computer-implemented method can comprise, for a services component that operates a service of a transaction, the services component being of a system operatively coupled to a processor, approaching consensus, by the services component, regarding a request of the transaction, the approaching consensus including communicating, by the services component, with one or more other services components that operate one or more other services immediately upstream or downstream in the transaction to the service.

According to yet another embodiment, a computer program product can facilitate a process for consensus regarding proceeding with a request of a transaction, the computer program product comprising a computer readable storage medium having program instructions embodied therewith, the program instructions executable by a processor to cause the processor to, for a services component that operates a service of a transaction, the services component being of a system operatively coupled to the processor, approach consensus, by the services component by the processor, regarding a request of the transaction, and communicate, by the services component by the processor, with one or more other services components that operate one or more other services immediately upstream or downstream in the transaction to the service.

An advantage of such system, computer-implemented method and/or computer program product can be fast and efficient performance of consensus achievement in a decentralized environment, such as absent employing global management for the communications. Long delays of communications to/from a centralized transaction entity and/or communication entity can be eliminated, which can be beneficial in a decentralized environment such as including one or more clouds comprising one or more services components participating in an end-to-end transaction.

In one or more embodiments of the above system, computer program product and/or method, the services component can approach the consensus by communicating only with the one or more other services components. An advantage of such system, computer-implemented method and/or computer program product can be avoidance of global knowledge regarding each services component of the set of services components at any services component. That is, sharing of knowledge, regarding services components for which any services component is not next/prior in performing an operation for the transaction, can be avoided. As such, a breakdown of trust and/or security at one services component of concern can be limited to knowledge relative only to the one or more services components next/prior to the service of concern.

In one or more embodiments of the above system, computer program product and/or method, the services component, the services component can approach consensus regarding the request absent global management of communications among the services component and the one or more other services components. An advantage of such system, computer-implemented method and/or computer program product can be performance of consensus achievement absent employing global management for the communications. Rather the communications can be managed by each individual services component of the set of services components of a transaction. Additionally, employment of processing power and memory for a global communication manager also can be avoided. High storage and persistence costs at a centralized transaction entity and/or communication entity can be avoided because a centralized transaction entity and/or communication entity is not employed and/or provides reduced operation relative to the transaction.

DETAILED DESCRIPTION

Figure 1:
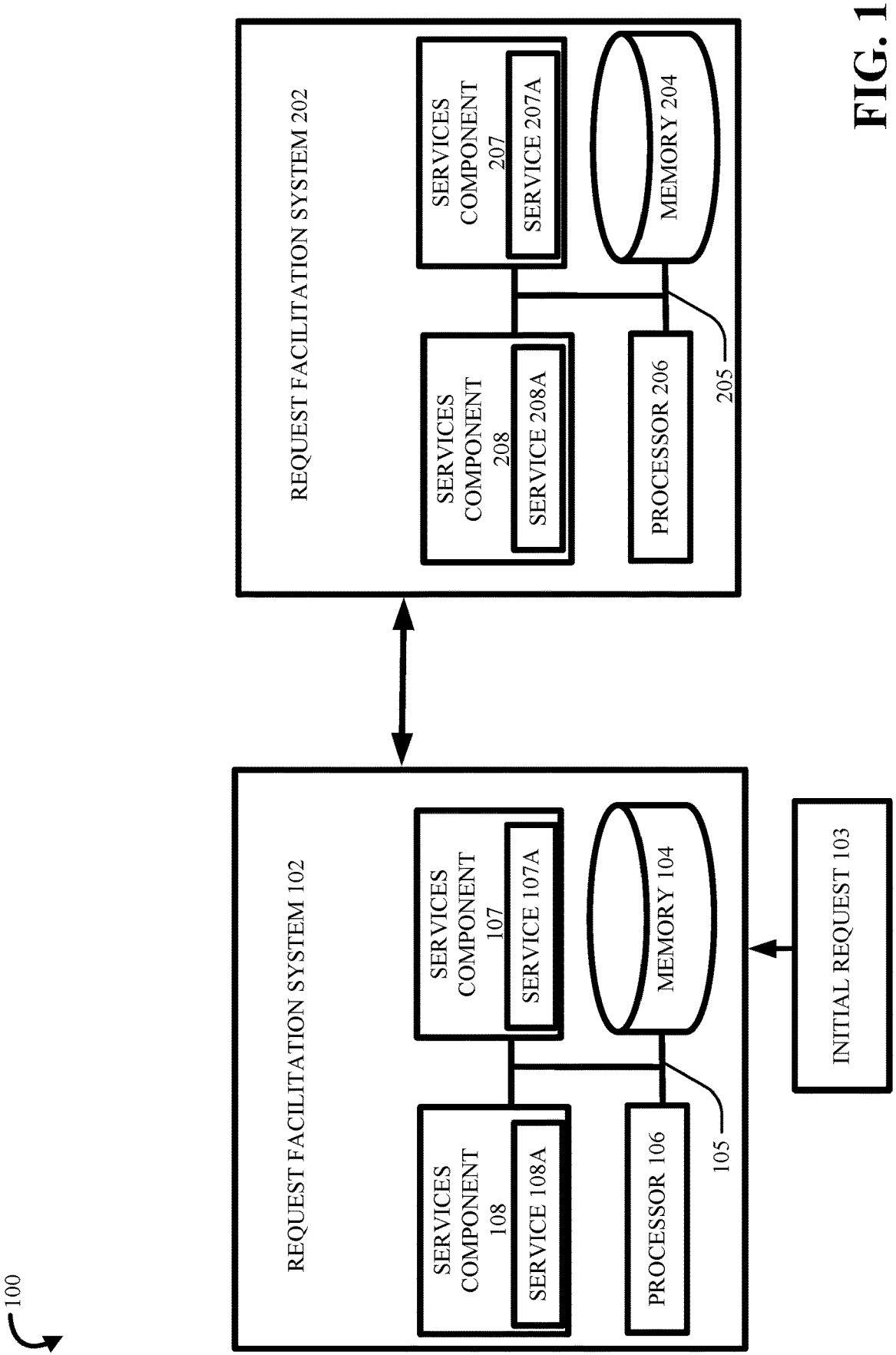
FIG. 1 illustrates a block diagram of an example, non-limiting system that facilitates a process for consensus regarding proceeding with a request of a transaction in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in this Detailed Description section.

Given the increasing use of transactional microservices or services, rather than existing use of monolithic architectures, it is desirable to provide an approach to approaching, and/or eventually achieving, consensus among services of a transaction, such as regarding a request of the transaction. This can particularly be the case where the one or more services components participating in a transaction, e.g., that perform one or more services of the transaction, are distributed in a decentralized manner. This distribution can be local and/or global. That is, the distribution can include services components participating in a transaction being located and/or run on a plurality of different systems that are decentralized relative to one another.

A distributed protocol can be employed for decentralized communications for achieving consensus among the one or more services components participating in a transaction, such as an end-to-end transaction. That is, a transaction can be requested to be executed. Each services component can perform a service of the requested transaction. Various effects of the services performed can be not made permanent unless and/or until all other services components involved in the transaction also succeed in performing their respective services.

The distributed protocol can be lightweight. The distributed protocol can eliminate use of and/or reliance on a global or central manager for managing achieving consensus regarding an initial request of a transaction. One or more embodiments of a system, apparatus, computer-implemented method, or computer program product are provided herein that can employ a distributed protocol for facilitating approaching consensus and/or eventual consensus over a plurality of decentralized services components participating in a transaction.

That is, the one or more embodiments can include execution, by the one or more services components, of communications amongst the one or more services components in a manner that does not employ global knowledge by any participant service of all participant services in the transaction. Instead, the protocol can dictate that the one or more services components communicate only with one or more other services components that operate one or more other services immediately upstream or downstream in the transaction to the services operated by the one or more services components. That is, for an individual services component, communication can be performed only with one or more other services components that operate one or more other services immediately upstream or downstream in the transaction to the service operated by the individual services component, such as with a same protocol being followed for other individual services components participating in the transaction.

The one or more embodiments also do not employ a centralized log of communications between all participant services components. Instead, individual ones of the participant services components can maintain individual logs of only communications in which the individual ones maintaining the log participated. That is, for an individual services component, the individual services component can maintain an individual durable log of only message communications in which the individual services component participated, such as with a same protocol being followed for other individual services components participating in the transaction.

The one or more embodiments also do not employ a centralized transaction and/or communication entity, such as a manager, coordinator and/or controller, of the communications for approaching and/or achieving consensus. Rather, individual ones of the one or more participating services components participating in a transaction propagate communications upstream or downstream within the transaction only to one or more other services components that operate one or more other services immediately upstream or downstream in the transaction to the services operated by the individual ones. In this way, a transaction can include multiple paths (e.g., of one or more services components) extending outwardly from one another, but still can enable localized communication control in the aforementioned immediate upstream- or downstream-limited manner.

Also, in this way, overhead of setting up a centralized transaction entity and/or communication entity can be eliminated in a predominantly decentralized environment of decentralized, but loosely coupled, services components. Also, in this way, long delays of communications to/from a centralized transaction entity and/or communication entity can be eliminated, which can be beneficial such as in a decentralized environment including one or more clouds. Also, in this way, high storage and persistence costs at a centralized transaction entity and/or communication entity can be avoided because a centralized transaction entity and/or communication entity is not employed and/or provides reduced operation relative to the transaction. Also, in this way, issues of trust of a centralized transaction entity and/or communication entity, such as relative to loss and/or breach of security of global knowledge of participant services components, can be avoided, because a centralized transaction entity and/or communication entity is not employed and/or provides reduced operation relative to the transaction.

One or more embodiments are now described with reference to the drawings, where like referenced numerals are used to refer to like elements throughout. As used herein, both above and below, the term "entity" can refer to a machine, device, smart device, component, hardware, software and/or human. In the following description, for purposes of explanation, numerous specific details are set forth in order to provide a more thorough understanding of the one or more embodiments. It is evident, however, in various cases, that the one or more embodiments can be practiced without these specific details.

Figure 3:
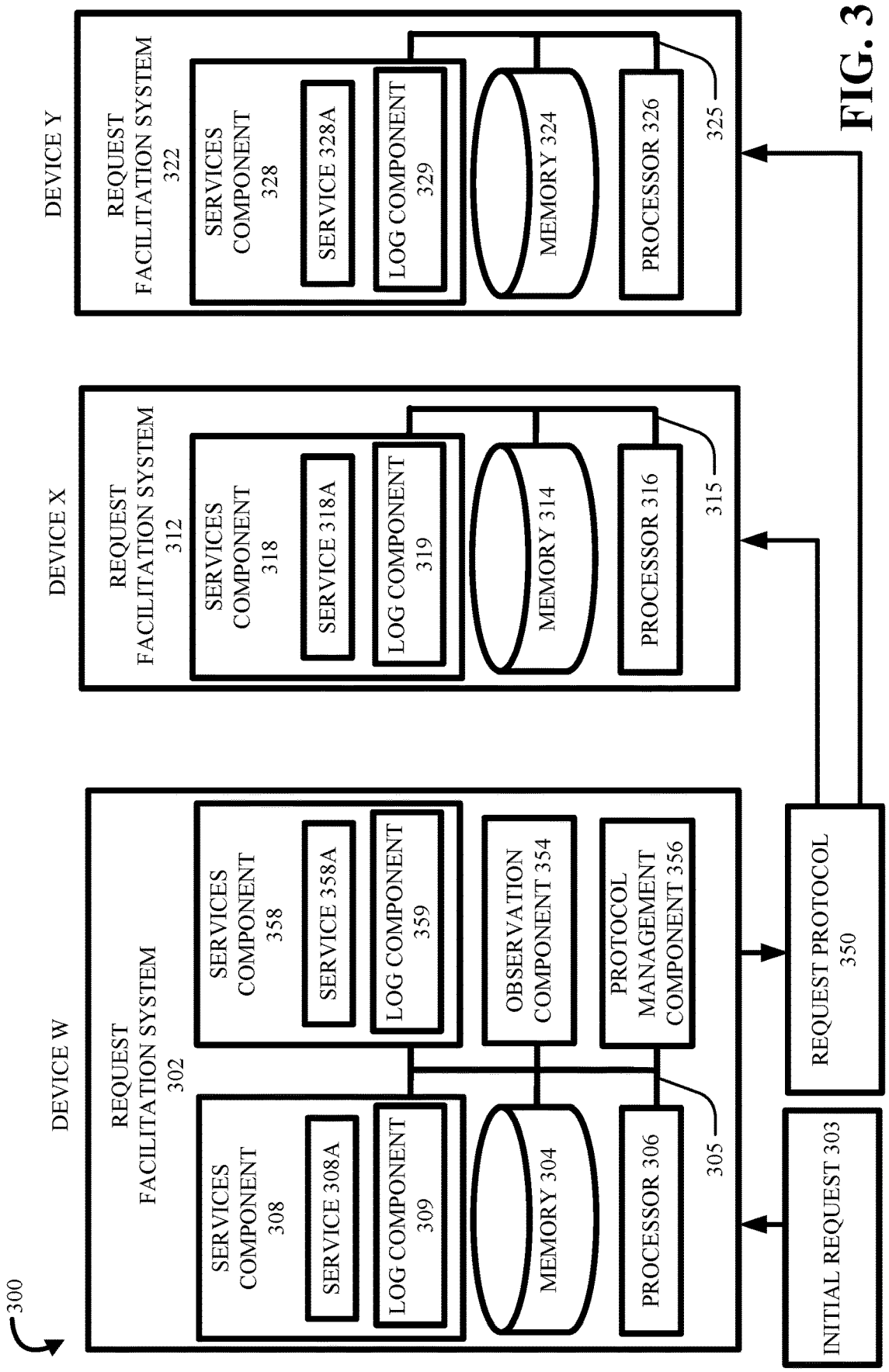
FIG. 3 illustrates another block diagram of an example, non-limiting system including a dependency topology that facilitates a process for consensus regarding proceeding with a request of a transaction, in accordance with one or more embodiments described herein.

Further, it will be appreciated that the embodiments depicted in one or more figures described herein are for illustration only, and as such, the architecture of embodiments is not limited to the systems, devices and/or components depicted therein, nor to any particular order, connection and/or coupling of systems, devices and/or components depicted therein. For example, in one or more embodiments, the non-limiting systems 100, 300 and/or 400 as illustrated at FIGS. 1, 3 and/or 4, and/or systems thereof, can further comprise one or more computer and/or computing-based elements described herein with reference to an operating environment, such as the operating environment 1400 illustrated at FIG. 14. In one or more described embodiments, computer and/or computing-based elements can be used in connection with implementing one or more of the systems, devices, components and/or computer-implemented operations shown and/or described in connection with FIGS. 1, 3 and/or 4 and/or with other figures described herein.

Figure 2:
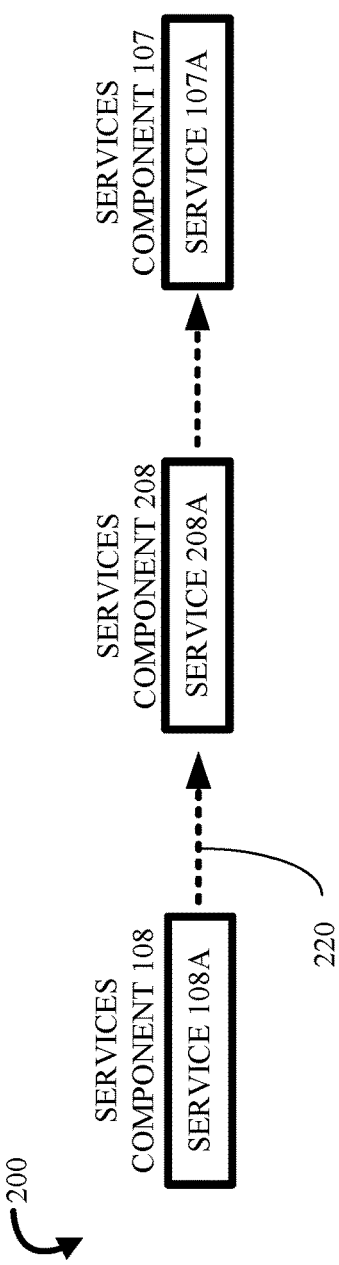
FIG. 2 illustrates a block diagram of an order of the services components of FIG. 1 in a transaction, in accordance with one or more embodiments described herein.

Turning first generally to FIGS. 1 and 2, illustrated is a block diagram of an example, non-limiting system 100 that facilitates a process for consensus regarding proceeding with a request of a transaction, in accordance with one or more embodiments described herein.

The non-limiting system 100 can comprise a request facilitation system 102. The request facilitation system 102, as illustrated, can comprise any suitable type of component, machine, device, facility, apparatus and/or instrument that comprises a processor and/or can be capable of effective and/or operative communication with a wired and/or wireless network. All such embodiments are envisioned. For example, request facilitation system 102 can comprise a server device, computing device, general-purpose computer, special-purpose computer, quantum computing device (e.g., a quantum computer), tablet computing device, handheld device, server class computing machine and/or database, laptop computer, notebook computer, desktop computer, cell phone, smart phone, consumer appliance and/or instrumentation, industrial and/or commercial device, digital assistant, multimedia Internet enabled phone, multimedia players and/or another type of device and/or computing device. Likewise, request facilitation system 102 can be disposed and/or run at any suitable device, such as, but not limited to a server device, computing device, general-purpose computer, special-purpose computer, quantum computing device (e.g., a quantum computer), tablet computing device, handheld device, server class computing machine and/or database, laptop computer, notebook computer, desktop computer, cell phone, smart phone, consumer appliance and/or instrumentation, industrial and/or commercial device, digital assistant, multimedia Internet enabled phone, multimedia players and/or another type of device and/or computing device.

The request facilitation system 102 can be associated with, such as accessible via, a cloud computing environment. For example, the request facilitation system 102 can be associated with a cloud computing environment 1550 described below with reference to FIG. 15 and/or with one or more functional abstraction layers described below with reference to FIG. 16 (e.g., hardware and software layer 1660, virtualization layer 1670, management layer 1680 and/or workloads layer 1690).

It will be appreciated that operation of the non-limiting system 100 and/or of the request facilitation system 102 is not limited to execution of a single transaction and/or achievement of one request at a time. Rather, operation of the non-limiting system 100 and/or of the request facilitation system 102 can be scalable. For example, the non-limiting system 100 and/or the request facilitation system 102 can execute one or more transactions and/or can facilitate approaching and/or achieving consensus for one or more requests at least partially in parallel with execution of one or more other transactions and/or facilitations of consensus for one or more other requests. In one or more embodiments, one or more services components of the non-limiting system 100 and/or of the request facilitation system 102 can be employed to execute at the same time two or more transactions including the one or more services components. In one or more embodiments, one or more services components of the non-limiting system 100 and/or of the request facilitation system 102 can be employed to communicate to facilitate approaching consensus regarding two or more requests at the same time.

Request facilitation system 102 can comprise one or more components, such as a memory 104, processor 106, bus 105, services component 107 and/or services component 108.

Generally, request facilitation system 102 can facilitate approaching and/or achieving consensus regarding an initial request 103 to an initial services component of a set of services components participating in a transaction. For example, the services components 107 and 108 of the request facilitation system 102 can participate in an exemplary transaction 200 (e.g. FIG. 2), to be discussed below in detail.

It will be appreciated that the one or more embodiments described herein are not limited to employing one or more services components and or communications with, for and/or or relative to any one or more particular transaction types. Rather, all suitable transaction types are envisioned, including, but not limited to, financial, purchase, reservation, medical and/or information request transactions.

As used herein, a service operated by a services component can be a microservice. Additionally and/or alternatively, a services component can include one or more aspects including, but not limited to, any suitable one or more applications, micro applications, algorithms, programs, data and/or data libraries. Additionally and/or alternatively, a services component can be containerized or provided in containerized format.

The one or more aspects of a services component can be employed separately and/or in combination, such as employing one or more of a memory or a processor of a system that includes the services component to thereby operate a service. For example, as illustrated, the services component 108 can perform a service 108A, and the services component 107 can perform a service 107A. The services component 108 and/or the services component 107 can employ the processor 106 and/or the memory 104. Additionally and/or alternatively, the processor 106 can execute one or more program instructions to cause the processor to perform the service 107A and/or the service 108A, by the respective services component 107 or services component 108.

It will be appreciated that a services component, container, service aspect and/or program instruction can be stored at any suitable location, such as the system memory, another internal memory and/or a memory and/or other location external to a system comprising a services component. For example, the services component 108, an aspect of the services component 108, a container of the services component 108 and/or a program instruction for operating and/or executing the services component 108 can be stored at any suitable location, such as the memory 104, another internal memory, an external memory and/or another external location. All service aspects of any services component can be stored in a same or separate locations. All service aspects of any services component can be stored at one or a plurality of systems. A services component, container, service aspect and/or program instruction can be accessed via any suitable method by the request facilitation system 102 and/or processor 106, such as via one or more communicative, electrical, operative, optical and/or other connection, such as a wired or wireless connection.

Relative to a transaction, services component of a set of services components of the transaction each can operate one or more services of the transaction to facilitate execution of the transaction. That is, the one or more service can be performed in an order, such as a preset order, determined order, selectively determined order, entity-determined order and/or the like. Such order can include one or more parallel paths, and/or one or more services that can be operated at least partially in parallel with one or more other services of the transaction.

Relative to an already-established transaction, such as the transaction 200 of FIG. 2, one or more services components can have trust established among one another. For example, services components participating in the transaction 200 that operate services that are immediately upstream and/or downstream one another can have trust established with one another, such as for delivery and/or receipt of communications.

As shown at FIG. 1, one or more services components of a set of services components participating in a transaction can be decentralized relative to one another. Likewise, one or more systems, e.g., request facilitation systems, comprising one or more services components of one transaction also can comprise one or more services components of another transaction. Alternatively and/or additionally, one or more services components participating in one transaction can participate in one or more other transactions.

For example, referring briefly specifically to FIG. 2, the services component 208 that performs the service 208A can be included in the transaction 200. It is noted that the services component 208, as illustrated, can be comprised by a system different from and decentralized relative to the request facilitation system 102. As illustrated, services component 208 can be comprised by a request facilitation system 202. Request facilitation system 202 can be disposed non-locally relative to the request facilitation system 102. That is, execution of the transaction 200 can include services performed by services components that are decentralized relative to one another. As shown at FIG. 2, the transaction 200 can be executed by a plurality of services components (e.g., services components 108, 208 and 107) that can perform a plurality of services (e.g., services 108A, 208A and 107A). Transaction 200, as illustrated, proceeds in a downstream direction represented by the arrows 220. That is, the execution of the transaction 200 proceeds from the initial and/or upstream-most service 108A of services component 108, to the service 208A of the services component 208, to the downstream-most service 107A of the services component 107.

Looking now specifically to the second request facilitation system 202 at FIG. 1, included is a processor 206, memory 204, bus 205, the services component 208 and the services component 207. The second request facilitation system 202, like the request facilitation system 102, includes one or more services components that operate services for executing the transaction 200 at FIG. 2. Accordingly, as indicated above, the transaction 200 comprises services component and/or services that are decentralized relative to one another.

Turning now to one or more operations of the request facilitation system 102 employing the transaction 200, the services components 107 and/or 108, and/or the service 107A and/or 108A, the request facilitation system 102 can receive the initial request 103. It will be appreciated that the initial request 103 can be directed to a particular transaction, such as being and/or including a request to execute the particular transaction. The initial request 103 can be provided in any suitable format, such as a text format, binary format and/or another suitable format.

In one or more embodiments, the initial request 103 can be received by the request facilitation system 102, such as by a component and/or aspect of the request facilitation system 102 other than the services components 107 and 108, such as the memory 104, a mail component and/or a download component. In one or more embodiments, the initial request 103 can be received by services component 107 and/or the services component 108. In one or more embodiments, the services component that receives the initial request 103 can be the upstream-most perform the upstream-most service in the transaction for which the initial request 103 is made.

The component, services component, system and/or other aspect receiving (e.g., initially and/or indirectly) the initial request 103 can employ any one or more aspects of an operating environment, such as the operating environment 1400 (FIG. 14), to receive and/or retrieve the initial request 103. By way of a non-limiting example, the initial request 103 can be uploaded from the HDD 1414, received from the memory/storage 1452 via the WAN 1456 and/or downloaded via the WAN 1456 from a node, such as a cloud computing node 1510 of a cloud computing environment 1550 (FIG. 15).

Communications among the services components participating in a respective transaction, here referring to the services components 108, 208 and 107 of the transaction 200, can be facilitated to approach and/or to achieve consensus among the services components on how to proceed regarding the initial request. That is, communications between the services components 108, 208 and 107 can be made to approach and/or to achieve consensus among these services components as to whether to persist or to abort execution of the transaction 200 in response to the initial request 103.

In one or more embodiments, communications among the services components participating in a respective transaction each can include a transaction ID, which can facilitate confirming and/or verifying that the communicating service components are participants of a particular transaction, and thus in one or more cases, that one or more messages received are relevant to that particular transaction.

The one or more communications can be facilitated by the one or more services components. For example, communications can be facilitated by wired and/or wireless means including, but not limited to, employing a cellular network, a wide area network (WAN) (e.g., the Internet), and/or a local area network (LAN). Suitable wired or wireless technologies for facilitating the communications can include, without being limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol and/or other proprietary and/or non-proprietary communication protocols.

These communications can be performed and/or otherwise facilitated according to a decentralized protocol, such as without employing any centralized communication manager and/or controller. Instead, referring now only to the request facilitation system 102, but relative to any other system comprising a services component participating in the transaction 200 (e.g., the second request facilitation system 202) the one or more services components 108 and 107 of a set of services components that perform services of the transaction 200 can individually control and/or record communications.

The one or more services components 108 and 107 can operate according to the decentralized protocol, such as to approach and/or achieve consensus regarding the initial request 103 of the transaction 200 by communicating with one or more other services components that operate one or more other services immediately upstream or downstream in the transaction to the services performed by the services components 108 and 107. That is, the services component 108 can communicate with one or more other services components, such as the services component 107, that operates one or more other services immediately upstream or downstream in the transaction to the service(s) performed by the services component 108. Likewise, the services component 107 can communicate with one or more other services components, such as the services component 108, that operates one or more other services immediately upstream or downstream in the transaction to the service(s) performed by the services component 107. That is, communication can proceed other than back and forth with a central communication manager and/or controller. Rather, communication can proceed between services components performing services of the transaction.

In one or more embodiments, such communication can proceed only between services components that perform services of a transaction that are immediately downstream and/or upstream of one another. That is, no communication proceeds between services components that do not perform services immediately downstream and/or upstream of one another. And further, global management of the communications for approaching and/or achieving consensus can be absent from the consensus approaching and/or achievement.

Further, in view of this protocol regarding communications between only services components that perform services of a transaction that are immediately downstream and/or upstream of one another, global knowledge regarding each services component of the set of services at a services component can be avoided. That is, sharing of knowledge regarding services component for which a services component is not immediately next and/or immediately prior in an order of the respective services performed for a transaction can be avoided. As such, a breakdown of trust and/or security at one services component of concern can be limited to knowledge relative only to the one or more services component that communicate with the services component of concern and/or that operate a service immediately upstream and/or downstream to a service operated by the services component of concern.

For example, relative to the transaction 200 at FIG. 2, service 108A proceeds to service 208A to service 107A to execute the transaction 200. Accordingly, only services component 208 is immediately next/prior to services component 108, only services component 208 is immediately next/prior to services component 107, and each of services components 108 and 107 are immediately next/prior to services component 208 in a service order of the transaction 200. As such, to approach and/or to achieve consensus regarding how to proceed regarding the initial request 103, services component 108 communicates only with services component 208, services component 208 communicates in an upstream and a downstream manner with both services components 108 and 107, and services component 107 communicates only with services component 208. services component 108 does not communicate with services component 107 to approach and/or to achieve consensus regarding the initial request 103.

It will be appreciated that it can be envisioned where one or more services components can communicate with one or more non-next/non-prior services components of the set of services components of a transaction, such as for one or more other purposes that are not and/or are not for approaching/achievement of consensus regarding the initial request 103. For example, in one or more embodiments, one or more services components can communicate with one or more non-next/non-prior services components of the set of non-next/non-prior services components of a transaction to execute the transaction, such as after consensus is reached to persist (e.g., perform) the transaction. For example, data can be shared between non-next/non-prior services components for the purpose of such transaction execution.

Additionally and/or alternatively, it will be appreciated that one or more embodiments can be envisioned where one or more services components in the performance order of a transaction can be skipped and/or ignored for a particular consensus achievement, such as where the skipped and/or ignored services component is omitted from a particular execution of such transaction. Additionally and/or alternatively, it will be appreciated that one or more embodiments can be envisioned where one or more services components of a transaction can communicate with one or more services components that do not perform immediate upstream or downstream services in the transaction. For example, in one or more such embodiments, a central controller can be utilized for a subset of the set of services components of a transaction. Nonetheless, to achieve rapid and/or or efficient achievement of consensus in a transaction, it will be appreciated that, in one or more embodiments, all, and/or at least a majority of, services components can communicate only with next/prior services components of the set of services components of a respective transaction.

Turning next to FIG. 3, the figure illustrates a diagram of an example, non-limiting system 300 that can facilitate process for consensus regarding proceeding with a request of a transaction, in accordance with one or more embodiments described herein. Repetitive description of like elements and/or processes employed in respective embodiments is omitted for sake of brevity.

As illustrated, the non-limiting system 300 includes a plurality, such as three, systems that each can comprise one or more services components for performing a transaction A, not shown. In one or more embodiments, the three systems can be disposed at and/or run on separate devices, such as device W, device X and device Y, as illustrated. Each of the devices W, X, Y can be and/or can comprise a server device, computing device, general-purpose computer, special-purpose computer, quantum computing device (e.g., a quantum computer), tablet computing device, handheld device, server class computing machine and/or database, laptop computer, notebook computer, desktop computer, cell phone, smart phone, consumer appliance and/or instrumentation, industrial and/or commercial device, digital assistant, multimedia Internet enabled phone, multimedia players and/or another type of device and/or computing device. In one or more embodiments, the three devices W, X and Y can be decentralized relative to one another. As such, the three devices W, X and Y can communicate over a WAN and/or a cloud environment, for example.

First request facilitation system 302 can be disposed at and/or run on device W. Second request facilitation system 312 can be disposed at and/or run on device X. Third request facilitation system 322 can be disposed at and/or run on device Y. Any one or more of the three systems can include one or more services components that can perform one or more services of the transaction A. Accordingly, the transaction A can comprise services components and/or services that are decentralized relative to one another.

First request facilitation system 302 can, as illustrated, include a processor 306, memory 304, bus 305, services component 308 and second services component 358. The services component 308 can be constructed, such as via the one or more service aspects comprised by the services component 308, to perform the service 308A. The services component 308 also can comprise a log component 309, although the log component 309 can be disposed separately from the services component 308 in one or more other embodiments. The services component 358 can be constructed, such as via the one or more service aspects comprised by the services component 358, to perform the service 358A. The services component 358 also can comprise a log component 359, although the log component 359 can be disposed separately from the services component 358 in one or more other embodiments.

The second request facilitation system 312 can, as illustrated, include a processor 316, memory 314, bus 315 and services component 318. The services component 318 can be constructed, such as via the one or more service aspects comprised by the services component 318, to perform the service 318A. The services component 318 also can comprise a log component 319, although the log component 319 can be disposed separately from the services component 318 in one or more other embodiments.

The third request facilitation system 322 can, as illustrated, include a processor 326, memory 324, bus 325 and services component 328. The services component 328 can be constructed, such as via the one or more service aspects comprised by the services component 328, to perform the service 328A. The services component 328 also can comprise a log component 329, although the log component 329 can be disposed separately from the services component 328 in one or more other embodiments.

Accordingly, relative to the transaction A, each of the services components 308, 358 and 318 can be comprised by and/or participate in the transaction A. Relative to another transaction B, for example, each of the services components 308, 358, 318 and 328 can be comprised by and/or participate in the transaction B.

Discussion now turns to the processor, memory and bus of the three request facilitation systems of the non-limiting system 300. While discussion is provided regarding only the processor 306, memory 304 and bus 305 of the first request facilitation system 302, the discussion likewise applies to the like components of the second request facilitation system 312 and third request facilitation system 322. It also will be appreciated that the discussion likewise applies to the like components of the request facilitation system 102 and the request facilitation system 202.

For example, in one or more embodiments, request facilitation system 302 can comprise a processor 306 (e.g., computer processing unit, microprocessor, classical processor, quantum processor and/or like processor). In one or more embodiments, a component associated with request facilitation system 302, as described herein with or without reference to the one or more figures of the one or more embodiments, can comprise one or more computer and/or machine readable, writable and/or executable components and/or instructions that can be executed by processor 306 to facilitate performance of one or more processes defined by such component(s) and/or instruction(s). In one or more embodiments, the processor 306 can comprise the services component 307, services component 358, observation component 354 and/or protocol management component 356.

In one or more embodiments, the request facilitation system 302 can comprise a computer-readable memory 304 that can be operably connected to the processor 306. The memory 304 can store computer-executable instructions that, upon execution by the processor 306, can cause the processor 306 and/or other components of the request facilitation system 302 (e.g., services component 307, services component 358, observation component 354 and/or protocol management component 356) to perform one or more actions. In one or more embodiments, the memory 304 can store computer-executable components (e.g., services component 307, services component 358, observation component 354 and/or protocol management component 356).

Request facilitation system 302 and/or a component thereof as described herein, can be communicatively, electrically, operatively, optically and/or otherwise coupled to one another via a bus 305 to perform functions of non-limiting system 300, request facilitation system 302 and/or one or more components thereof and/or coupled therewith. Bus 305 can comprise one or more of a memory bus, memory controller, peripheral bus, external bus, local bus, quantum bus and/or another type of bus that can employ one or more bus architectures. One or more of these examples of bus 305 can be employed to implement one or more embodiments described herein.

In one or more embodiments, request facilitation system 302 can be coupled (e.g., communicatively, electrically, operatively, optically and/or like function) to one or more external systems (e.g., request facilitation system 312 and/or request facilitation system 322), sources and/or devices (e.g., classical and/or quantum computing devices, communication devices and/or like devices), such as via a network. In one or more embodiments, one or more of the components of the non-limiting system 300 can reside in the cloud, and/or can reside locally in a local computing environment (e.g., at a desired location(s)).

In addition to the processor 306 and/or memory 304 described above, request facilitation system 302 can comprise one or more computer and/or machine readable, writable and/or executable components and/or instructions that, when executed by processor 306, can facilitate performance of one or more operations defined by such component(s) and/or instruction(s).

The log components 309, 359, 319 and 329 each can perform one or more log generation functions for the respective individual service (e.g., services components 308, 358, 318 and 328, respectively) that comprise the log components 309, 359, 319 and 329. It will be appreciated that although separate log components are illustrated at FIG. 3, one or more log components can instead perform one or more log generation functions for two or more services components, such as of a same system or local environment, in one or more other embodiments.

Referring now to the log component 309, but relevant to any of the illustrated log components, the log component 309 can maintain, for an individual one of the one or more services components (e.g., the services component 308), an individual durable log of only message communications in which the individual one (e.g., the services component 308) participated. For example, the log component 309 can generate one or more records of one or more communications and/or data and/or metadata regarding the one or more communications, which can be stored together, such as in the form of a log. The log can be a matrix, library and/or other database. The one or more records can be stored in any suitable format, such as text, binary and/or other suitable format. The log can be stored at the respective services component (e.g., the services component 308), at the respective request facilitation system (e.g., the request facilitation system 302), and/or at any other location internal or external to the respective request facilitation system, such as the respective memory (e.g., memory 304). Transfer of the one or more records to the log can be made by any suitable method of communication, whether wired or wireless, such as including one or more of the methods describe above with reference to transfer of messages/communications for facilitation of consensus achievement relative to FIGS. 1 and 2.

The individual log can be observed, reviewed and/or otherwise utilized by the request facilitation system 302, services component 308, observation component 354 (to be described below in detail) and/or non-limiting system 300, such as in the occurrence of a communication error and/or timeout relative to a consensus achievement of a transaction comprising the services component 308 and/or service 308A. That is, the observation and/or review can be facilitated via any suitable computer component and/or aspect, such as for the purpose of loading a historical position of a crashed and/or restarted service/services component relative to one or more requests, votes and or final decisions relative to the respective consensus achievement.

Turning now to one or more additional components of the non-limiting system 300, and still referring to FIG. 3, one of the request facilitation systems 302, 312 and 322 can include an observation component 354 and/or a protocol management component 356. As illustrated, the request facilitation system 302 can comprise the observation component 354 and the protocol management component 356. In one or more other embodiments, the services component 308 and/or the services component 358 can comprise a protocol management component 356. Likewise, relative to the request facilitation system 312 and 322, the services component 318 and/or the services component 328 can additionally and/or alternatively comprise a protocol management component 356.

Turning first to the observation component 354, the observation component 354 can facilitate observation by an administrating entity of the communications as the communications occur and/or after the communications occur. As indicated above, the observation component 354 can be employed to facilitate loading and/or determining a historical position of a crashed and/or restarted service/services component. The observation component 354 likewise can monitor the communications among the service components. The monitoring can be passive, such as only observing and/or recording, absent interference with the decentralized operation of the decentralized protocol by the one or more services components. That is, in one or more embodiments, the observation component 354 can monitor communications between and/or among any of the services components of the set of services components participating in a transaction. In one or more embodiments, the observation component 354 can determine that consensus has been or will not be reached for a transaction. For example, the observation component 354 can observe a subset of votes communicated thus far, which subset of votes can include one or more negative votes, thereby indicating that consensus to commit the requested transaction will not be achieved. Additionally and/or alternatively, via the monitoring, the observation component 354 can determine and/or verify that the communications between the services components of a set of services components are confined to next/prior ones of the set of services component (e.g., those operating immediate upstream and/or downstream services relative to one another).

In one or more embodiments, it will be appreciated that zero or more observation components can be included and/or that observation of the communications relative to one or more services components can be absent from the observation processes performed by any one or more such observations components.

Turning next to the protocol management component 356, this component can, such as initially, transfer, push, upload and/or otherwise send a protocol 350 providing one or more communication limits and/or rules for achieving consensus according to the one or more embodiments as described herein, to the one or more services components of a set of services components of a transaction. The one or more communication limits can include the confinement of communication messages between services components to those services components that are next/prior relative to one another. In one or more embodiments, the protocol 350 can define and/or facilitate determination of what services components are to be identified as next/prior relative to one another. In one or more embodiments, the protocol 350 can include a set of program instructions and/or decisions for facilitating communication of particular types of messages, such as including requests, votes and/or final decisions, as illustrated at the communication diagram 500 of FIG. 5, to be described below in detail. In one or more embodiments, such rules can be diagrammatically illustrated such as the state diagram 600 of FIG. 6, to be described below in detail.

Protocol 350 can be transferred via any suitable method of communication, whether wired or wireless, such as including one or more of the methods describe above with reference to transfer of messages/communications for facilitation of consensus achievement relative to FIGS. 1 and 2. Additionally and/or alternatively, in one or more embodiments, any one or more of the request facilitation systems 302, 312 and 322 and/or the services components 308, 358, 318 and 328 can already comprise and/or be constructed to operate according to the request protocol 350 and/or another protocol in accordance with the one or more embodiments described herein. For example, one or more services components can be separately constructed to operate according to the protocol 350, such as during initial construction of a services component, such as absent protocol 350 being transferred to one or more services components.

Figure 4:
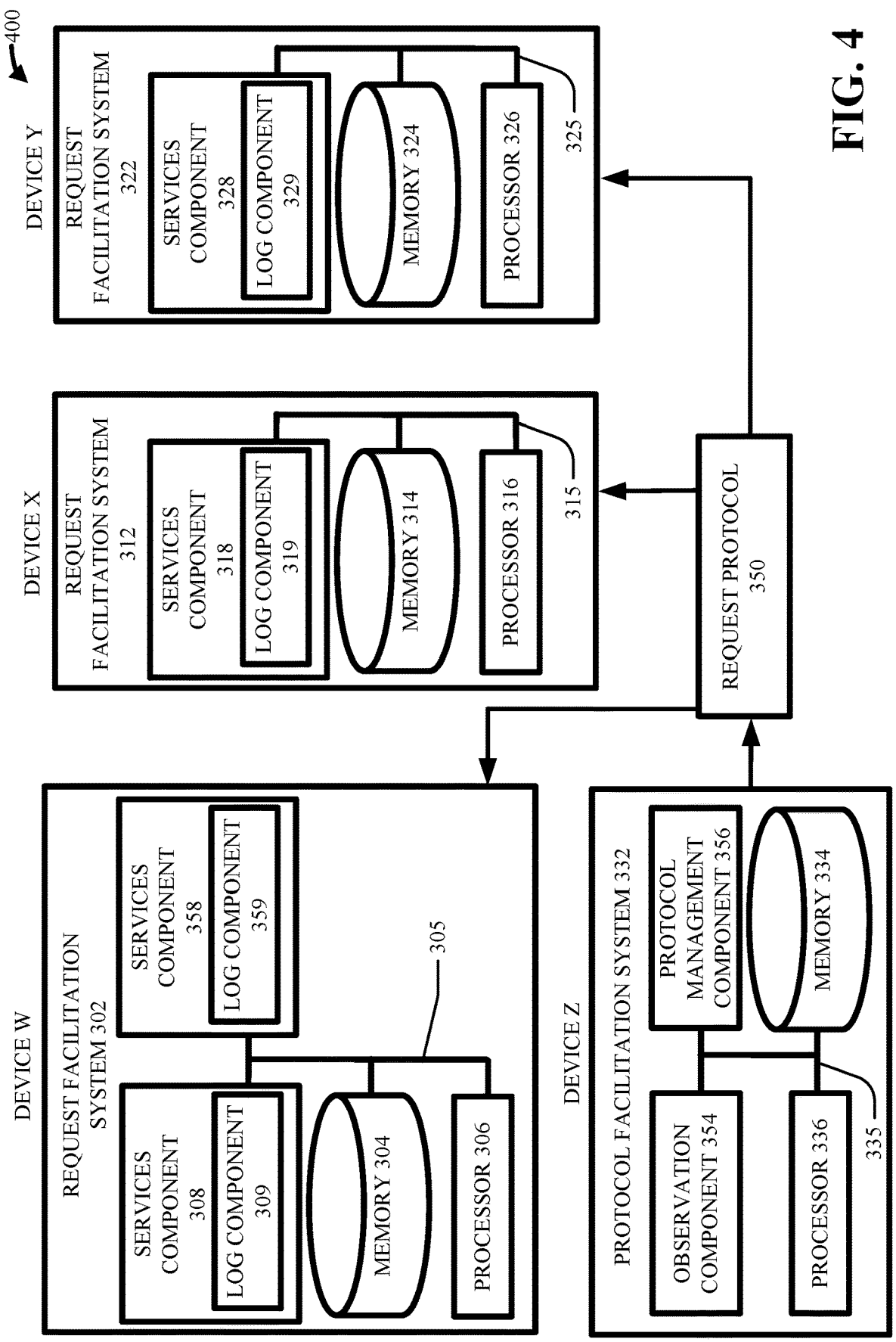
FIG. 4 illustrates yet another block diagram of an example, non-limiting system including a dependency topology that facilitates a process for consensus regarding proceeding with a request of a transaction, in accordance with one or more embodiments described herein.

Turning now briefly to FIG. 4, the figure illustrates a diagram of an example, non-limiting system 400 that can facilitate a process for consensus regarding proceeding with a request of a transaction, in accordance with one or more embodiments described herein. Repetitive description of like elements and/or processes employed in respective embodiments is omitted for sake of brevity.

The non-limiting system 400 is substantially similar to the non-limiting system 300. Different from the non-limiting system 300, it will be appreciated that a separate system, such as a protocol facilitation system 332, can comprise the observation component 354 and/or protocol management component 356, along with a respective processor 336, memory 334 and bus 335. That is, it will be appreciated that in one or more embodiments, the observation component 354 and/or the protocol management component 356 can be comprised by a system other than a system comprising a services component participating in a transaction (e.g., the request facilitation systems 302, 312 and 322).

The protocol facilitation system 332 can be comprised at a device Z. The device Z can be and/or can comprise one or more server device, computing device, general-purpose computer, special-purpose computer, quantum computing device (e.g., a quantum computer), tablet computing device, handheld device, server class computing machine and/or database, laptop computer, notebook computer, desktop computer, cell phone, smart phone, consumer appliance and/or instrumentation, industrial and/or commercial device, digital assistant, multimedia Internet enabled phone, multimedia player and/or another type of device and/or computing device. The device Z can be local and/or decentralized relative to any one or more of the devices W, X and/or Y. Communication between the device Z and any one or more of the devices W, X and/or Y can be by any suitable means, such as LAN, WAN and/or cloud environment, for example.

Figure 5:
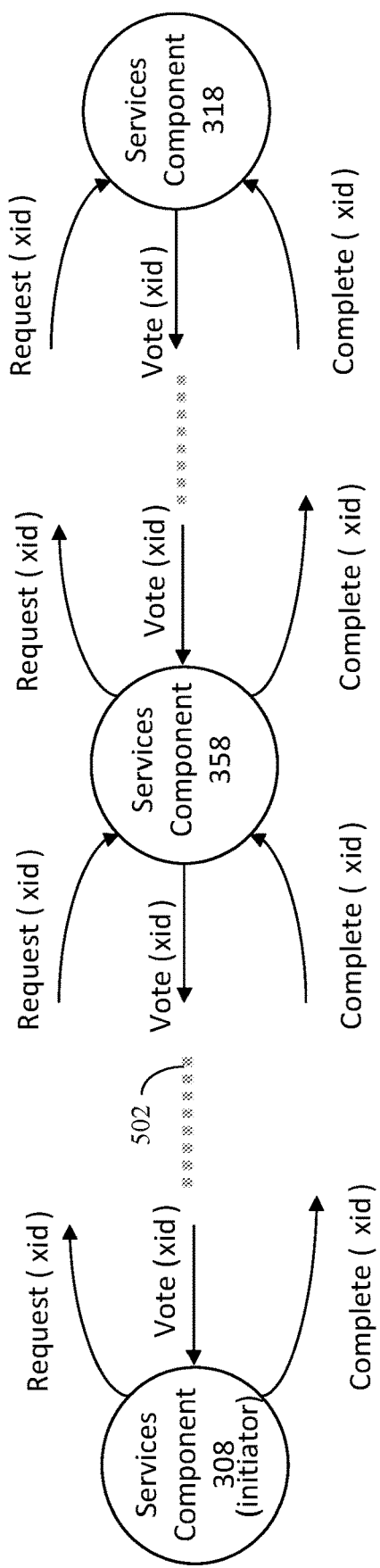
FIG. 5 illustrates a flow diagram of an example consensus facilitation of the transaction of FIG. 3 provided by the non-limiting system of FIG. 1, in accordance with one or more embodiments described herein.

Turning now specifically to FIG. 5, and also to FIG. 3, a communication diagram 500, being a flow diagram, illustrates an exemplary flow of communications between next/prior ones of the services components of the set of services components of the transaction A, with reference to FIG. 3. As indicated above, transaction A comprises each of the services components 308, 358 and 318. It will be appreciated that services component 308 can be the initial service that received the initial request 303. It will be appreciated that the temporal dots 502 represent a suitable communication method, and that the "xid" represents a transaction ID included with each communication.

As indicated above, the one or more services components 308, 358 and 318 can communicate messages that can include one or more requests, votes or final decisions. As also indicated above, each of these message types can be text, binary and/or any other format.

A request (e.g., a secondary request different from the initial request 303 of FIG. 3), can be a message requesting performance of the service of the related services component, to thereby facilitate eventual propagation of execution of the transaction. The requests can generally be propagated downstream (e.g., in the direction of the usual execution of the transaction, which is left to right at FIG. 5) within the transaction. The one or more services components can propagate communication of the requests toward one or more services components of the set of services components that perform one or more downstream-most services of the transaction (e.g., in the direction of services component 318 at FIG. 5).

The votes can be responses to the requests, and generally can include an indication of yes/no, proceed/not proceed and/or persist/abort. The votes can generally be propagated upstream (e.g., in the reverse direction of the usual execution of the transaction, which is right to left at FIG. 5) within the transaction. The one or more services components can propagate communication of one or more votes to accept or to abort the initial request or the one or more secondary requests toward one or more services components of the set of services components that perform one or more upstream-most services of the transaction (e.g., in the direction of the services component 308).

Where an intermediate services component is both sending a vote and receiving a vote, such as the services component 358, the intermediate services component can employ the respective individual log to recognize that it is waiting to receive a vote from a downstream participant services component (e.g., the services component 318) based on having sent a request downstream. Accordingly, the intermediate services component can send a combined vote upstream upon receiving a vote from the downstream participant. The combined vote sent by the intermediate services component can be a communication having a single vote, such that anyone no, not proceed and/or abort vote can cause a combined vote to also be no, not proceed and/or abort. It is noted that the vote received by the intermediate services component can itself be a combined vote.

Further, where the vote-communicating services component is an intermediate services component, and thus is waiting on a downstream vote, the vote-communicating services component can, such as via the protocol 350, be constructed to send a vote upstream before receiving a vote from downstream, where the self-provided vote is negative (e.g., no, not proceed and/or abort). In this way, propagation of votes can be advanced more quickly, without waiting for a downstream vote that cannot change the outcome of a combined vote (e.g., because a single negative vote is already included in what will become the combined vote). It also is noted that each vote communicated upstream can be a single vote, whether being a combined vote or a non-combined negative vote. That is, vote communications generally do not include more than a single communication, according to the one or more embodiments described herein. Where an early negative vote is communicated upstream, the later-received downstream vote can be recorded but ignored.

The final decision is generally propagated in a downstream direction from the one or more services components (e.g., the services component 308 at FIG. 5) that perform the one or more upstream-most services toward the one or more services components (e.g., the services component 318 at FIG. 5) that perform the one or more downstream-most services. The final decision can be a combined vote of all votes received from downstream participants. That is, the upstream-most services component can receive a single vote communication that either includes a combined vote of all downstream participants or at least a single negative vote from a downstream participant services component. Accordingly, upon receiving a vote communication, the upstream-most services component can communicate a single final decision (also referred to herein as a "complete") to each downstream next/prior services component. That same final decision can be propagated to the downstream-most services component. Upon receiving a positive final decision communication, any individual services component can initiate performing the respective service performed by the one individual services component of the transaction.

In one or more other embodiments, one or more additional message types can be utilized to approach and/or to achieve consensus, such as in accordance with the one or more limitations and/or rules herein, such as confining communications to those between next/prior services components, for the achievement of consensus relative to an initial request to a transaction.

Figure 6:
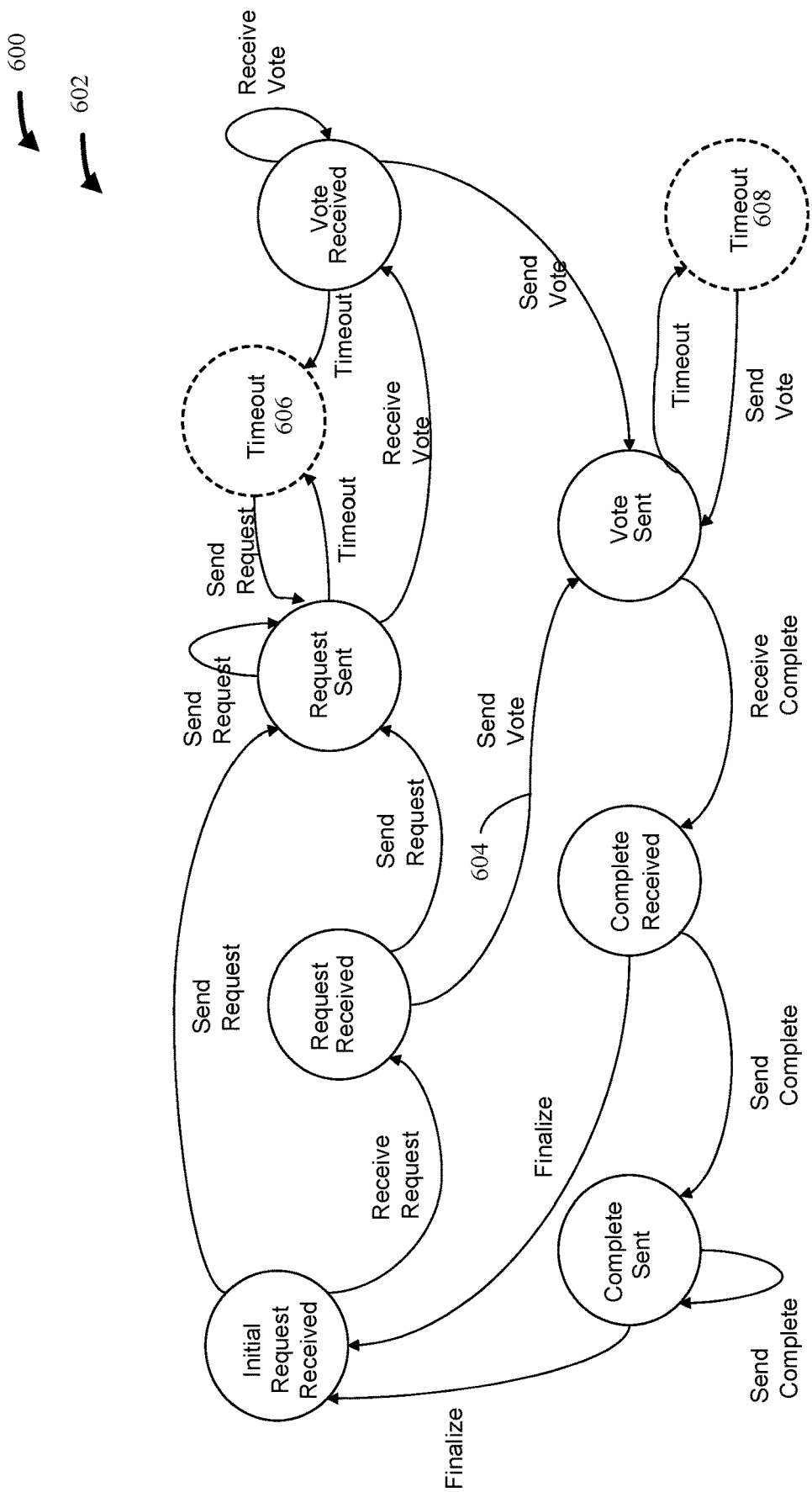
FIG. 6 illustrates a state diagram that is a flow diagram that diagrammatically illustrates example possible propagations of messages and or states of a single service, in accordance with one or more embodiments described herein.

Referring now to FIG. 6, the state diagram 600 diagrammatically illustrates the example possible propagations of messages and or states of a single services component, in accordance with one or more embodiments described herein. That is, the state diagram 600 provides a different format to illustrate the communication of request, vote and final decision messages, but relative to a single services component 602. At the state diagram 600, communications are represented by arrows, with actions having been performed being represented by the circular objects.

By way of example, the communication 604 can be sent where the transaction does not include a next/prior downstream services component relative to the services component 602, or where the vote of the services component 602 is negative. By way of example, the timeout 606 can occur where a request is communicated downstream, but no vote communication is received within a determined time window by the services component 602. It will be appreciated that a timeout window can be determined, such as by default, via the protocol 350, and/or can be selectively determined by an entity. It will be appreciated that a timeout window length of time can be specific to a transaction or type of transaction. It will be appreciated that a timeout window length can be specific to a type of communication. That is, the different communication types of request, vote and final decision each can employ a different timeout window length of time. By way of another example, the timeout 608 can occur where a vote communication has been sent by the services component 602, but where a final decision has not been received. Progression of the consensus achievement in a case of a timeout will be further described below with respect to FIGS. 9 and 10.

Figure 7:
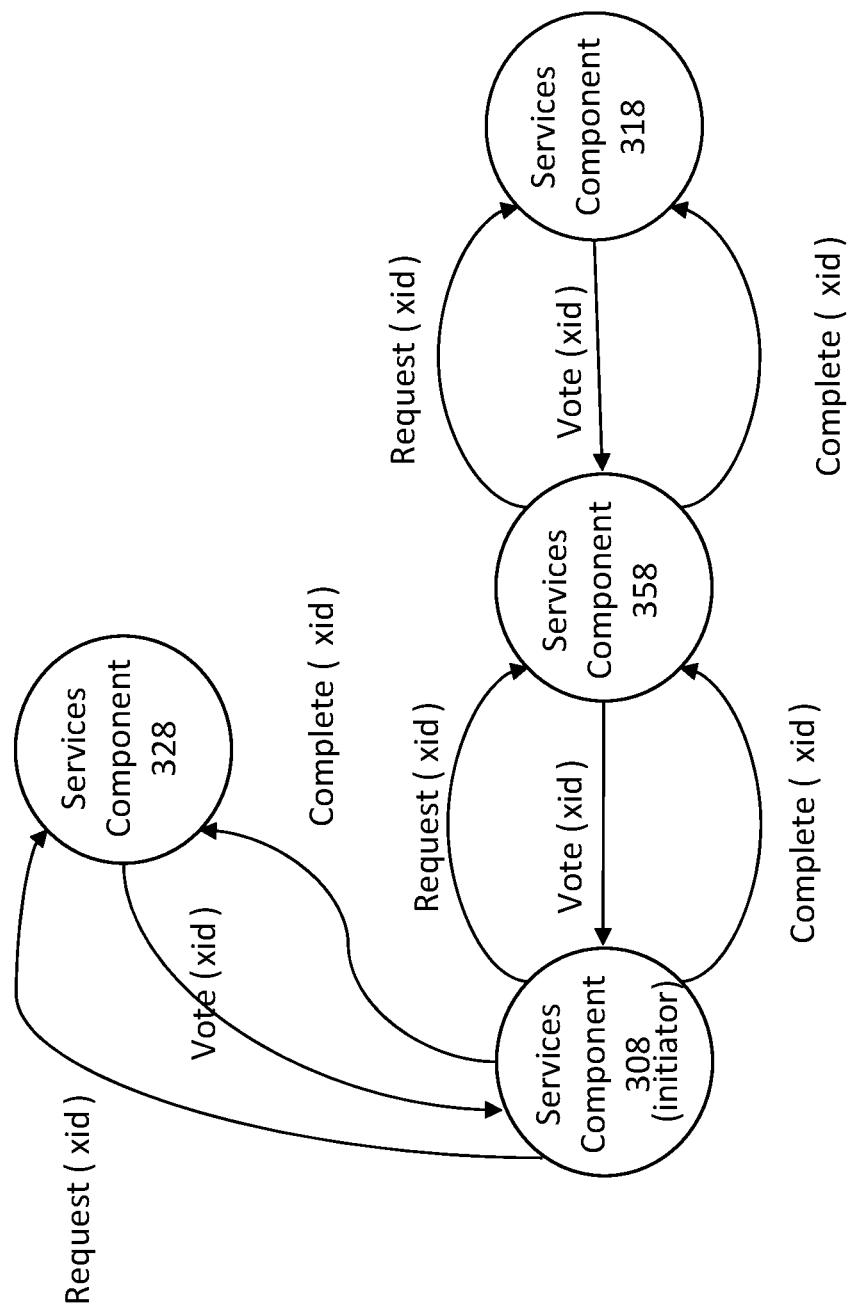
FIG. 7 illustrates a flow diagram of an example consensus facilitation of a transaction having parallelly-proceeding paths, in accordance with one or more embodiments described herein.

Looking next to FIG. 7, and also to FIG. 3, another communication diagram 700, being another flow diagram, illustrates an exemplary flow of communications between next/prior ones of the services components of the set of services components of the transaction B, also with reference to FIG. 3. As indicated above, transaction B comprises each of the services components 308, 358, 318 and 328. Looking at FIG. 7, the lower portion of the communication diagram 600, including the services components 308, 358 and 318, is identical to the communication diagram 500. In addition, the communication diagram 600 illustrates that propagation of communications for consensus approach/achievement, and thus also propagation of execution of services for the transaction, can proceed along two or more parallel paths. That is, the execution of services and communication propagation of the transaction B can branch out from the services component 308. For example, the initiator (most-upstream) services component 308 can send request communications to each of the services components 358 and 328. The request communications can include at last partially different data and/or requests, relative to the particular services operated by the particular services components 358 and 328. Likewise, the services component 308 can receive multiple vote communications (e.g., from services component 358 and from services component 328), where multiple request communications were likewise sent.

Figure 8:
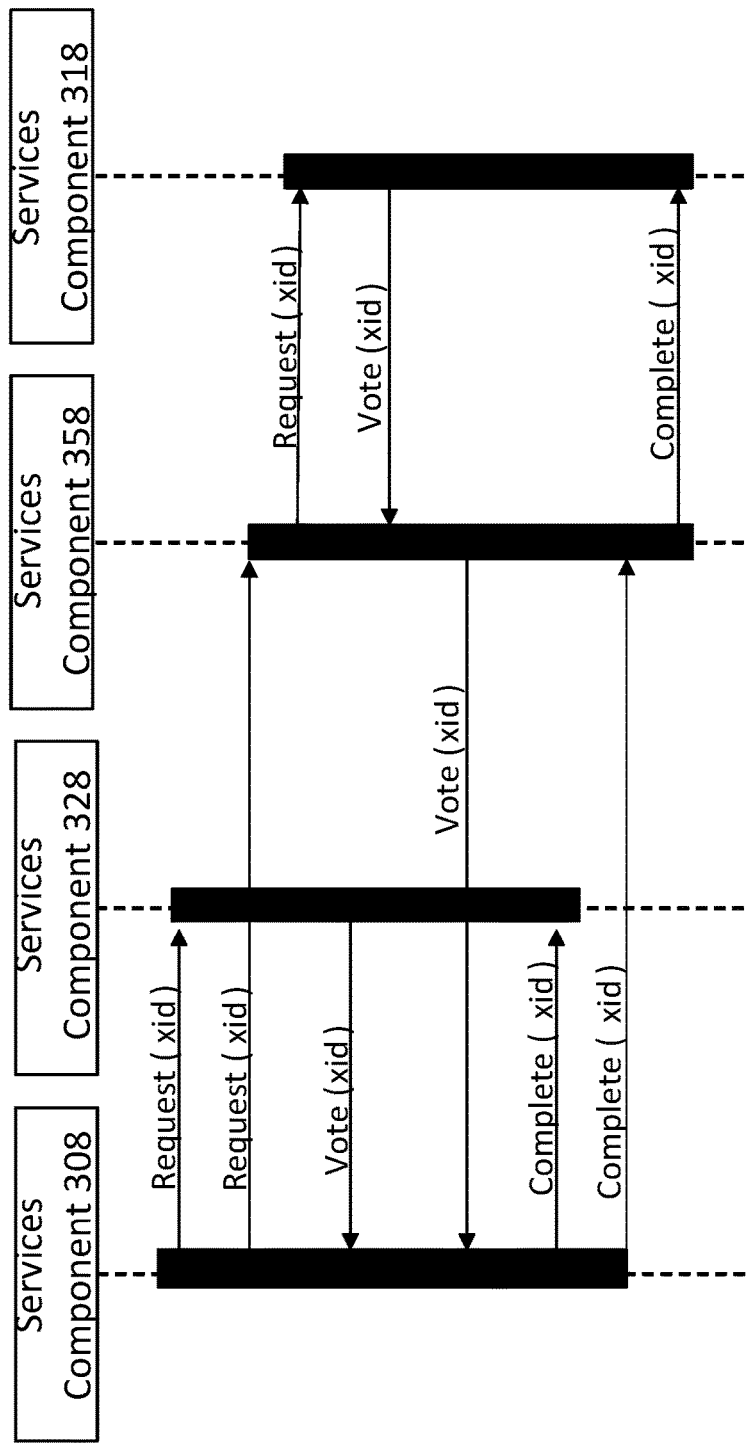
FIG. 8 illustrates another block diagram of the example consensus facilitation of FIG. 7, in accordance with one or more embodiments described herein.

Referring now to FIG. 8, an additional block diagram is illustrated that provides an alternative representation of the same propagation of communications as illustrated at the communication diagram 700 at FIG. 7.

Figure 9:
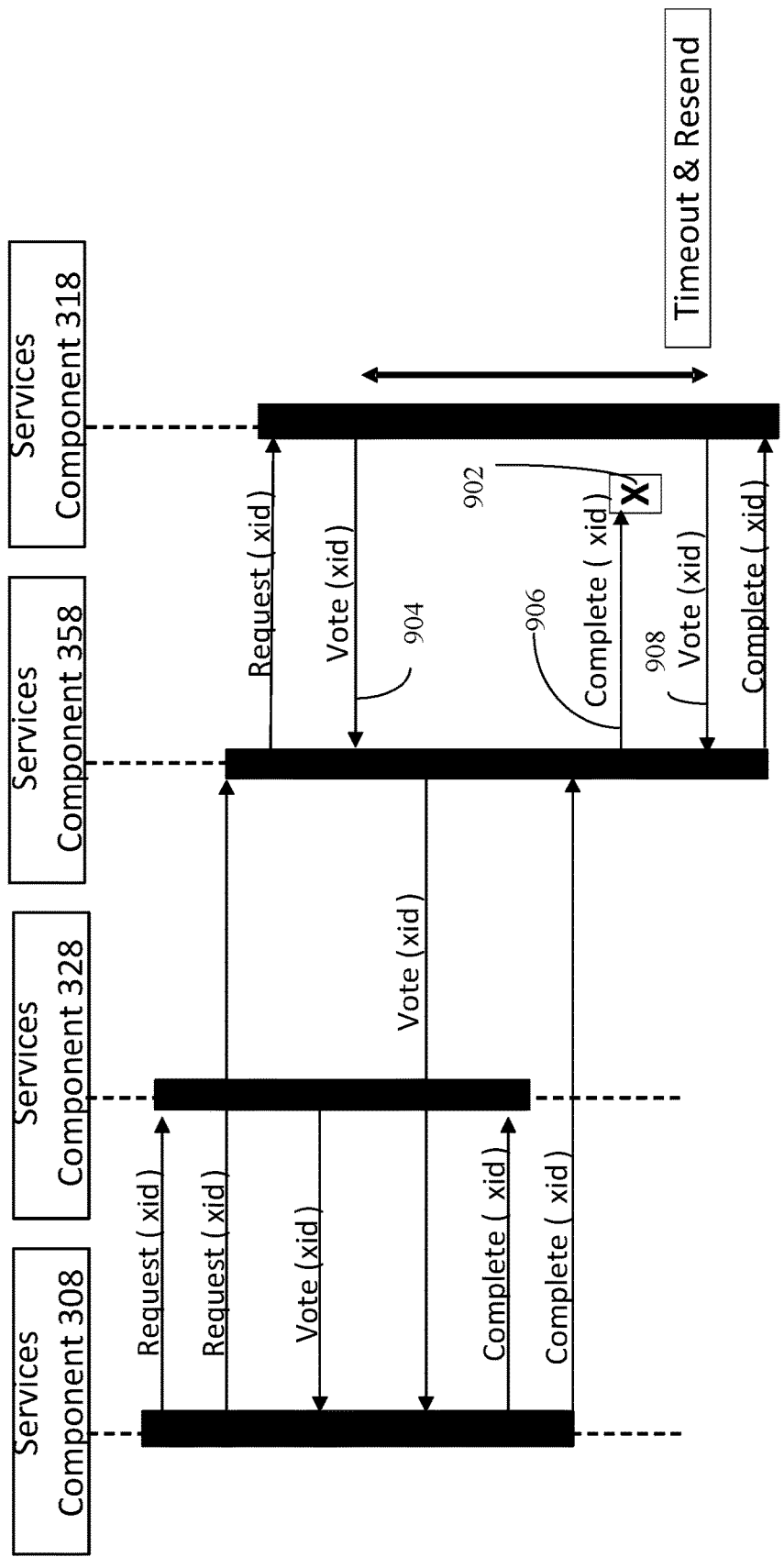
FIG. 9 illustrates yet another block diagram of the example consensus facilitation of FIG. 7, in accordance with one or more embodiments described herein.
Figure 10:
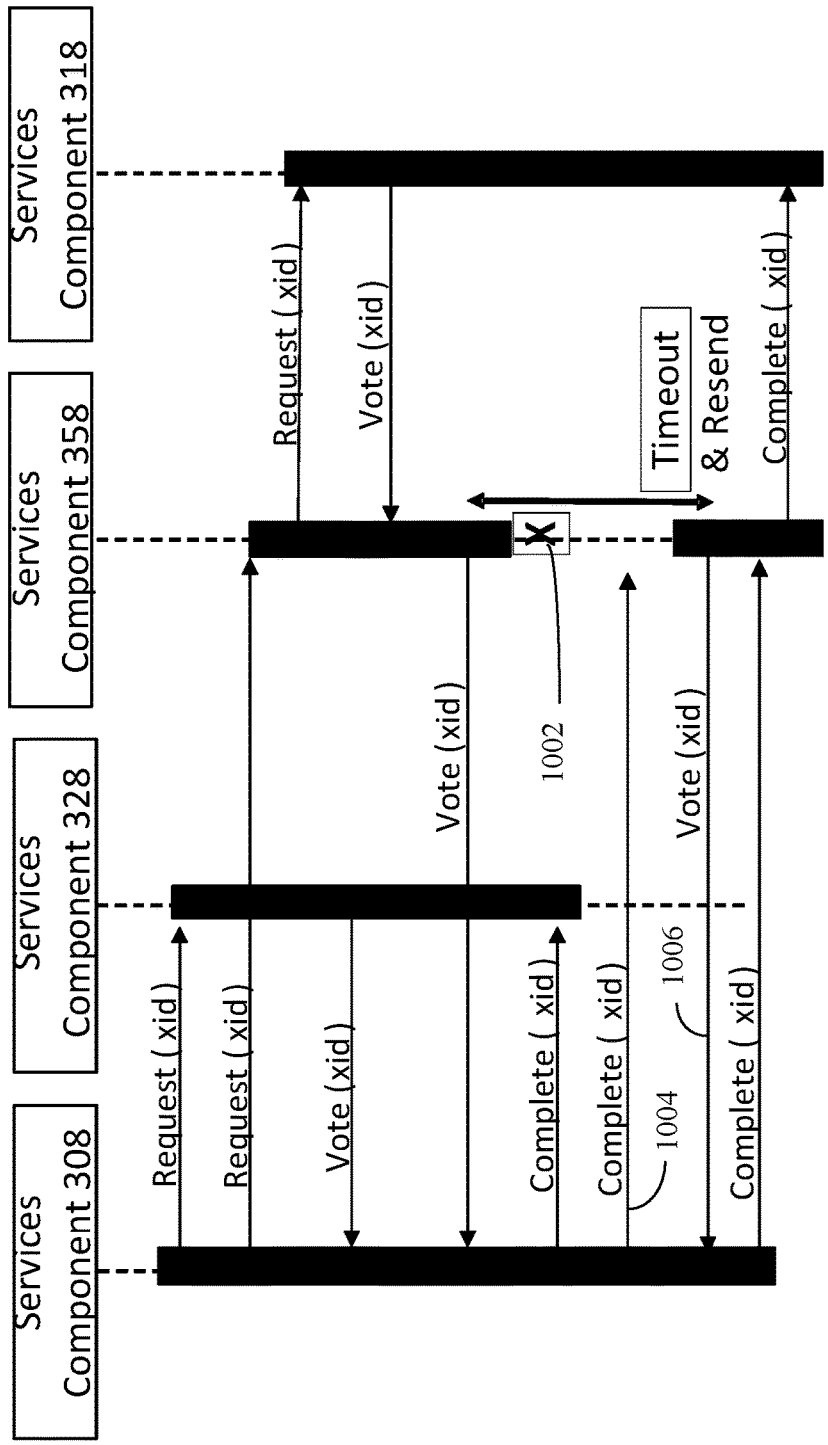
FIG. 10 illustrates still another a block diagram of the example consensus facilitation of FIG. 7, in accordance with one or more embodiments described herein.

Looking now to FIGS. 9 and 10, the one or more embodiments described herein, for facilitating a process for consensus regarding proceeding with a request of a transaction, also can account for one or more errors and/or timeouts in communications relative to achieving the consensus. As illustrated at communication failure 902 of the diagram 900 of FIG. 9, where a communication is not completed or is registered, such as in a log, by a process for consensus regarding proceeding with a complete message of a transaction B as not being received, the prior communication 904 that should have prompted the missing and/or non-received communication 906 can be resent as a resent communication 908. This resend can be facilitated by the services component 318 that did not receive the communication 906. In one or more embodiments, this resend/recommunication can be facilitated after a restart or timeout of the services component 318, and/or service operated thereby, recording the error. That is, a crash and/or error in a services component, and/or service operated thereby, can have at least partially caused the failure to receive the missing and/or non-received message.

Additionally and/or alternatively, where the resend of a communication does not facilitate receipt of the previously missing and/or non-received communication, an error message or record can be logged. In one or more embodiments and error message, being a fourth type of message discussed herein, can be sent to the previous services component (e.g., to the services component 358) from the services component (e.g., services component 318) recording the error, prompting a restart of the previous services component (e.g., services component 358) and resend of one or more most recent communications indicated as having been sent in the individual log of the previous services component (e.g., services component 358).

As illustrated at communication failure 1002 of the diagram 1000 of FIG. 10, an error can be caused by a crashed or errored services component (e.g., services component 358), and/or a service operated thereby. Upon a timeout of the errored services component 358, and/or service operated thereby, to restart or otherwise fix and/or rectify one or more errors in the services component 358, the individual log of the errored services component 358 can be employed to determine one or more missing and/or non-received communications 1004 and to send in response one or more repeat communications 1006.

Figure 11:
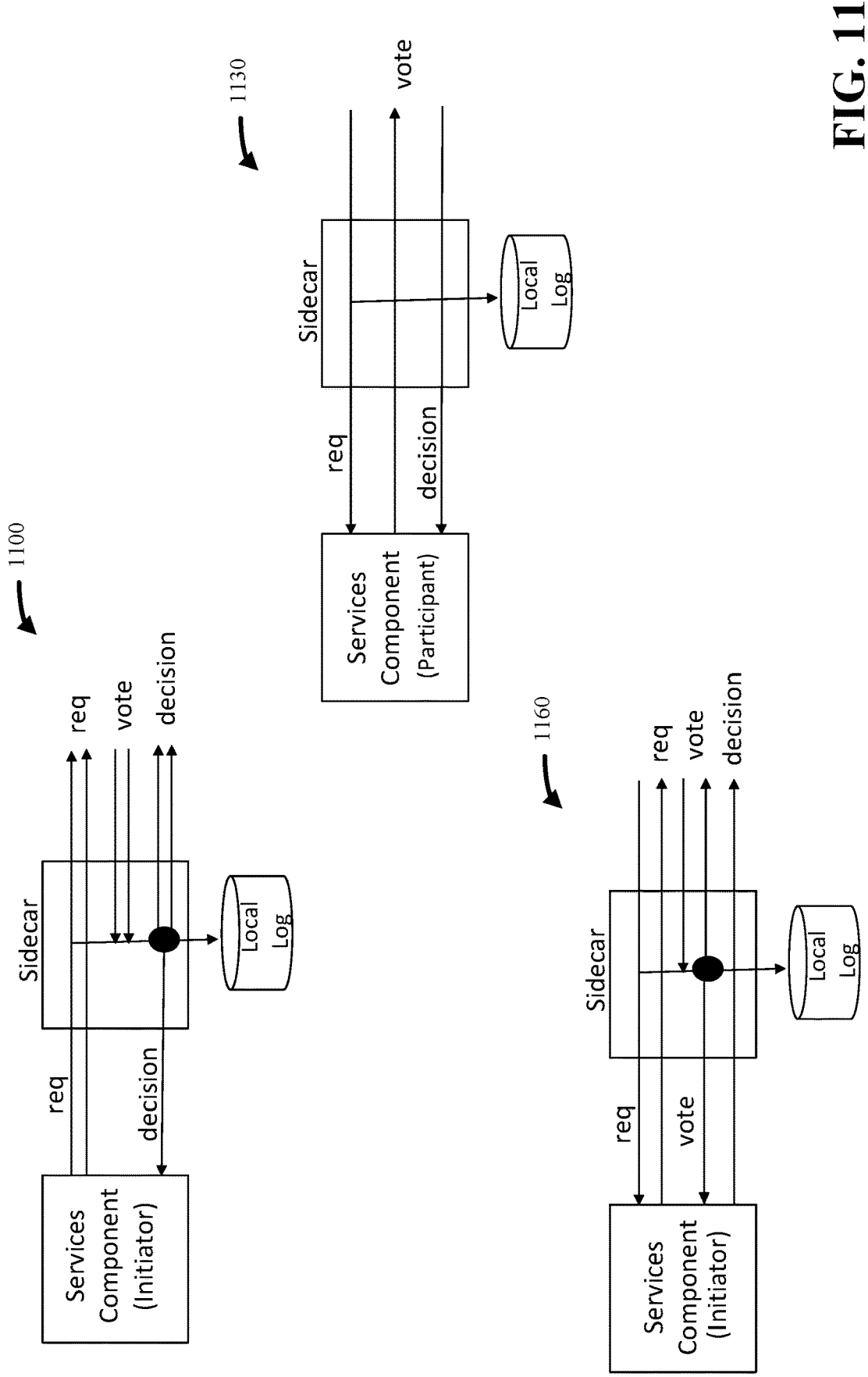
FIG. 11 illustrates three exemplary block diagrams of example uses of a sidecar for facilitating a process for consensus regarding proceeding with a request of a transaction, in accordance with one or more embodiments described herein.

Looking next to FIG. 11, a sidecar or other assistant application and/or program can be employed by any individual services component to offload one or more communications and/or other actions to be performed. In this way, the services component itself can limit size and/or memory employed, such as by offloading some implementation logic of the decentralized communications protocol to the sidecar. In one or more embodiments, a sidecar can be a containerized application. In one or more embodiments, a sidecar or associated container can be disposed within a container of a respective services component employing the sidecar. It will be appreciated that a sidecar application can be stored in any suitable location relative to storage of the respective services component employing the sidecar application.

At FIG. 11, three diagrams 1100, 1130 and 1160 illustrate different uses of a sidecar application. At diagram 1100, the sidecar application can be employed to receive and combine vote communications and also to determine and send a final decision communication. At diagram 1100, the services component is the initial or initiator services component (e.g., the upstream-most services component of a transaction). The sidecar application at diagram 1100 also can be employed to generate and/or store the individual communication log (e.g., local log) for the respective services component at diagram 1100. At diagram 1130, the sidecar application can be employed only to generate and/or store the individual communication log (e.g., local log) for the respective services component at diagram 1130. At diagram 1160, the sidecar application can be employed to generate and/or store the individual communication log (e.g., local log) for the respective services component at diagram 1160. Also at diagram 1160, the sidecar application can be employed to receive, combine and send vote communications. It is noted that the sidecar application at diagram 1160 is not employed to also send the final decision communication.

Figure 12:
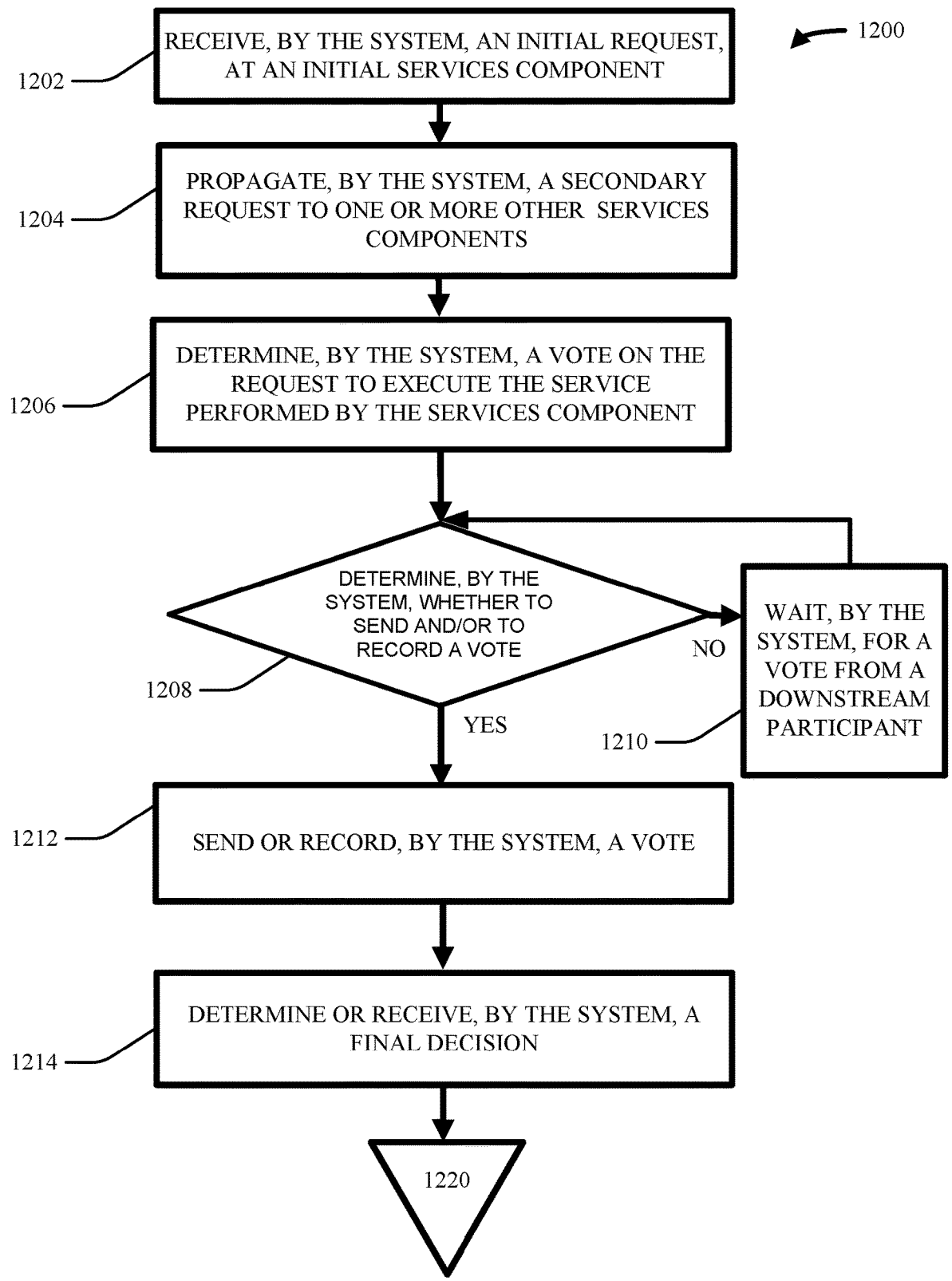
FIG. 12 illustrates a flow diagram of an example, non-limiting computer-implemented method that can facilitate a process for consensus regarding proceeding with a request of a transaction, in accordance with one or more embodiments described herein.
Figure 13:
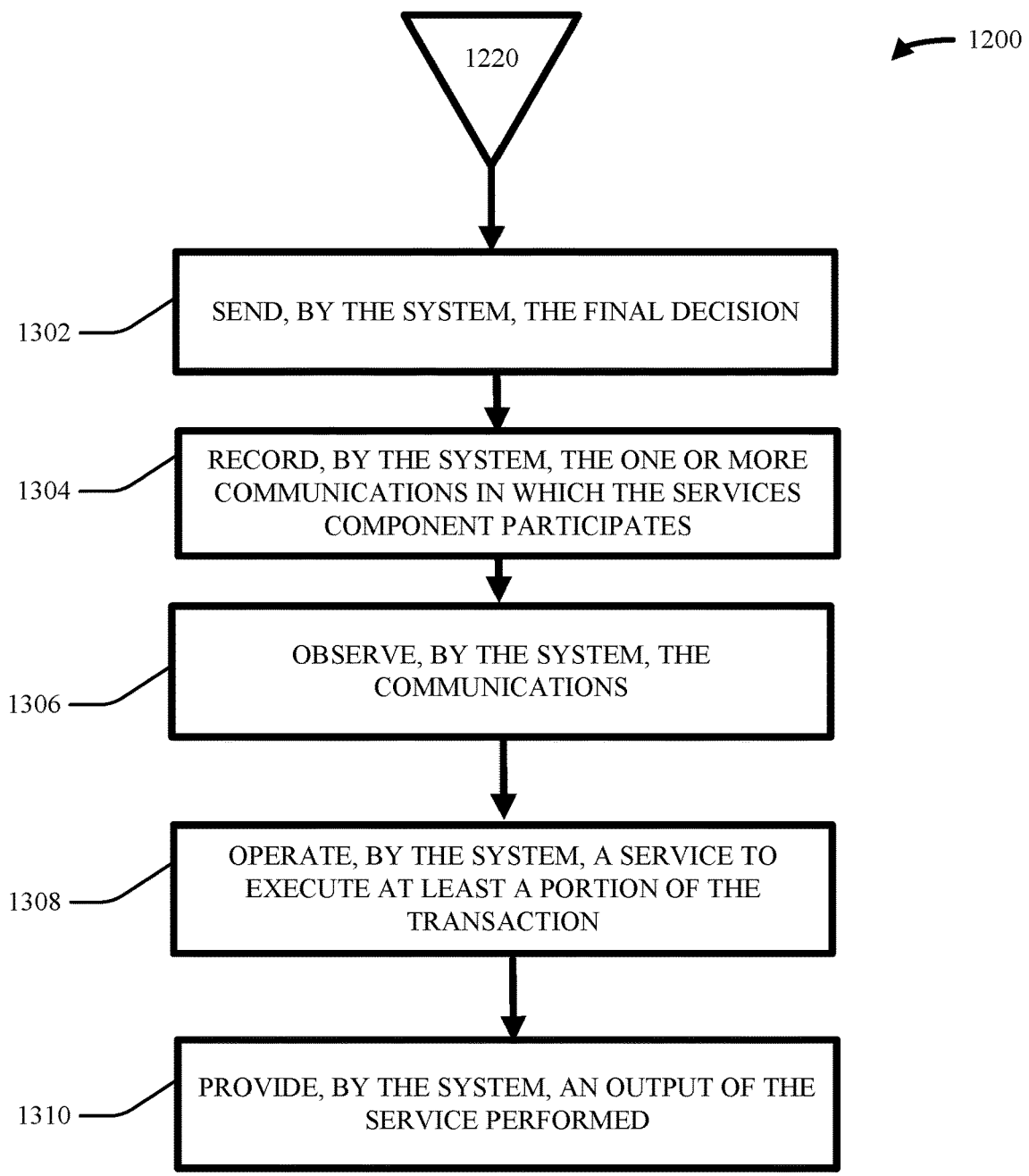
FIG. 13 illustrates a continuation of the flow diagram of FIG. 12, of an example, non-limiting computer-implemented method that can facilitate a process for consensus regarding proceeding with a request of a transaction, in accordance with one or more embodiments described herein.

Turning now to FIGS. 12 and 13, these figures together illustrate a flow diagram of an example, non-limiting computer-implemented method 1200 that can facilitate a process for consensus regarding proceeding with a request of a transaction, in accordance with one or more embodiments described herein with respect to the non-limiting system 300. It will be appreciated that while the computer-implemented method 1200 is described relative to the non-limiting system 300, the computer-implemented method 1200 can be applicable also to the non-limiting system 100 and/or non-limiting system 400. It also will be appreciated that many of the flow blocks of the computer-implemented method 1200 are performed with respect to a single services component 308. Nonetheless, the computer-implemented method 1200 can be relevant to one or more other services of the non-limiting system 300 of a particular transaction. Additionally, that one or more flow blocks are directed to a single services component 308 does not negate that a respective transaction can include one or more additional services components and/or services. Repetitive description of like elements and/or processes employed in respective embodiments is omitted for sake of brevity.

Looking first to 1202 at FIG. 12, the computer-implemented method 1200 can comprise receiving, by a system (e.g., via services component 308 and/or request facilitation system 302) operatively coupled to a processor (e.g., processor 306), an initial request (e.g., initial request 303) at an initial services component (e.g., services component 308 of transaction A).

At 1204, the computer-implemented method 1200 can comprise propagating, by the system (e.g., via services component 308), a secondary request (e.g., a communication requesting operation of the service 308A) to a next/prior services component (e.g., one performing a service of a transaction that is immediately downstream of a service performed by the services component 308).

At 1206, the computer-implemented method 1200 can comprise determining, by the system (e.g., via services component 308) a vote (e.g., yes/no) on the request to execute the service (e.g., service 308A) operated by the services component (e.g., services component 308).

At 1208, the computer-implemented method 1200 can comprise determining, by the system (e.g., via services component 308), whether to send a vote to a next/prior services component (e.g., one operating a service of a transaction that is immediately downstream of a service performed by the services component 308) or to record a vote (such as an at individual log of the services component 308, such as employing the respective log component 309). For example, where the services component 308 is the upstream-most service, no vote is sent, and rather the method proceeds to block 1212. For example, where the vote of the services component 308 is a no vote, then the method can proceed to block 1212. For example, where the vote of the services component 308 is a yes vote, or where a vote has not yet been received from a downstream participant service to which the services component 308 sent a request communication, the method can instead proceed to block 1210.

At 1210, the computer-implemented method 1200 can comprise waiting, by the system (e.g., via services component 308), for a vote (e.g., a vote communication) from the downstream participant (e.g., services component 358 of transaction A).

At 1212, the computer-implemented method 1200 can comprise sending or recording, by the system (e.g., via the services component 308 and/or log component 309) a vote (e.g., a vote communication or vote decision).

At 1214, the computer-implemented method 1200 can comprise determining or receiving, by the system (e.g., via the services component 308) a final decision (e.g., a final decision communication). That is, where the services component 308 is the initiator services component, the services component 308 can determine a final decision communication. Alternatively, where the services component 308 is an intermediate services component, the services component 308 can receive the final decision from immediately upstream in the transaction (e.g., transaction A).

Next, FIG. 13 illustrates an alternative continuation of the method 1200 partially illustrated at the flow diagram of FIG. 12. At FIG. 13, the method 1200 of FIG. 12 is continued, represented by the continuation triangle "B" 1220 illustrated at each of FIGS. 12 and 13. Repetitive description of like elements and/or processes employed in respective embodiments is omitted for sake of brevity.

At 1302, the computer-implemented method 1200 can comprise sending, by the system (e.g., via services component 308) the final decision (e.g., final decision communication), e.g., downstream in the transaction (e.g., transaction A).

At 1304, the computer-implemented method 1200 can comprise recording, by the system (e.g., via the services component 308 and/or log component 309) the one or more communications in which the services component (e.g., the services component 308) participates (e.g., sends and/or receives).

At 1306, the computer-implemented method 1200 can comprise observing, by the system (e.g., via observation component 354) the communications.

At 1308, the computer-implemented method 1200 can comprise operating, by the system (e.g., via services component 308), the service (e.g., service 308A) to execute at least a portion of the transaction (e.g., transaction A).

At 1310, the computer-implemented method 1200 can comprise providing, by the system (e.g., via services component 308) an output of the service performed (e.g., service 308A).

For simplicity of explanation, the computer-implemented methodologies provided herein are depicted and/or described as a series of acts. It is to be understood and appreciated that the subject innovation is not limited by the acts illustrated and/or by the order of acts, for example acts can occur in one or more orders and/or concurrently, and with other acts not presented and described herein. Furthermore, not all illustrated acts can be utilized to implement the computer-implemented methodologies in accordance with the described subject matter. In addition, those skilled in the art will understand and appreciate that the computer-implemented methodologies could alternatively be represented as a series of interrelated states via a state diagram or events. Additionally, it should be further appreciated that the computer-implemented methodologies described hereinafter and throughout this specification are capable of being stored on an article of manufacture to facilitate transporting and transferring the computer-implemented methodologies to computers. The term article of manufacture, as used herein, is intended to encompass a computer program accessible from any computer-readable device or storage media.

In summary, the one or more embodiments described herein can enable improved performance of consensus achievement relative to a request received by a transaction as compared to existing techniques. This improved performance can be achieved via confining communications for approaching and/or achieving the consensus to being performed between next/prior ones of services components of a set of services components of a transaction, where next/prior ones are those operating an immediate upstream or downstream service of the transaction (e.g., relative to a service performed by a communicating service). In one or more embodiments, such communication can proceed absent employing global management for the communications. Rather the communications are managed by each individual services component of the set of services components of a transaction.

In view of this manner of confined communications, global knowledge regarding each services component of the set of services components at any services component and/or other component can be avoided. That is, sharing of knowledge regarding services components for which any services component is not next/prior with can be avoided. As such, a breakdown of trust and/or security at one services component of concern can be limited to knowledge relative only to the one or more services components next/prior to the service of concern. Additionally, employment of processing power and memory for a global communication manager also can be avoided.

In one or more cases, one or more embodiments described herein can allow for increased scaling of execution of one or more transaction consensus achievements and/or request facilitations in view of increased execution time and/or execution quality of the one or more embodiments described herein as compared to existing techniques. Additionally and/or alternatively, employing the described subject matter can allow for reduced cost and/or complexity of a system employed to execute a transaction consensus achievement and/or request facilitation, at least in view of avoiding employing a global communication manager, according to the described subject matter.

A practical application of the request facilitation systems described herein is that such system can be implemented in one or more domains to enable scaled program execution, such as consensus execution. Indeed, use of a request facilitation system as described herein can be scalable, such as where a request facilitation system can perform at least one consensus approach/achievement at least partially in parallel at a same time with another consensus approach/achievement, relative to a same or different transaction. Another practical application of one or more embodiments described herein can be individually-controlled execution of one or more execution instructions, e.g., at one or more services components of a transaction, for performing one or more individually-managed communications. In another example, another practical application of one or more embodiments described herein can be controlled execution of one or more execution instructions for performing one or more operations by one or more real-world computers and/or computer-aided and/or -facilitated devices, e.g., by one or more services components for operating one or more services that have one or more real-world results, such as financial, monetary, reservation and/or purchase results.

Furthermore, a request facilitation system described herein can facilitate one or more technical improvements of a computer and/or computer system operating and/or comprising such request facilitation system. For example, request facilitation system as described herein can provide individual communication management absent employing a global communication manager. In this way, employment and or utilization of the reduced memory, time and/or computing power can be facilitated as compared to existing techniques. As a result, a request facilitation as described herein can facilitate faster and/or more efficient consensus approach/achievement as compared to existing techniques.

The systems and/or devices have been (and/or will be further) described herein with respect to interaction between one or more components. It should be appreciated that such systems and/or components can include those components or sub-components specified therein, one or more of the specified components and/or sub-components, and/or additional components. Sub-components can be implemented as components communicatively coupled to other components rather than included within parent components. One or more components and/or sub-components can be combined into a single component providing aggregate functionality. The components can interact with one or more other components not specifically described herein for the sake of brevity, but known by those of skill in the art.

It is to be appreciated that one or more embodiments described herein are inherently and/or inextricably tied to computer technology and cannot be implemented outside of a computing environment. For example, one or more processes performed by one or more embodiments described herein can more efficiently, and even more feasibly, provide program and/or program instruction execution as compared to existing systems and/or techniques. Systems, computer-implemented methods and/or computer program products facilitating performance of these processes are of great utility in the field of service and/or microservice transactions and/or related computation and cannot be equally practicably implemented in a sensible way outside of a computing environment.

It also is to be appreciated that one or more embodiments described herein can employ hardware and/or software to solve problems that are highly technical in nature (e.g., related to digital to analog conversion and/or binary searching of a plurality of data), that are not abstract, and that cannot be performed as a set of mental acts by a human. For example, a human, or even thousands of humans, cannot efficiently, accurately and/or effectively compute digital to analog conversions and/or binary searching of a plurality of data in the time that one or more embodiments described herein can facilitate this process. And, neither the human mind nor a human with pen and paper electronically compute digital to analog conversions and/or binary searching of a plurality of data as conducted by one or more embodiments described herein.

In one or more embodiments, one or more of the processes described herein can be performed by one or more specialized computers (e.g., a specialized processing unit, a specialized classical computer, a specialized quantum computer, a specialized hybrid classical/quantum system and/or another type of specialized computer) to execute defined tasks related to the one or more technologies describe above. One or more embodiments described herein and/or components thereof can be employed to solve new problems that arise through advancements in technologies mentioned above, employment of quantum computing systems, cloud computing systems, computer architecture and/or another technology.

One or more embodiments described herein can be fully operational towards performing one or more other functions (e.g., fully powered on, fully executed and/or another function) while also performing the one or more operations described herein.

Figure 14:
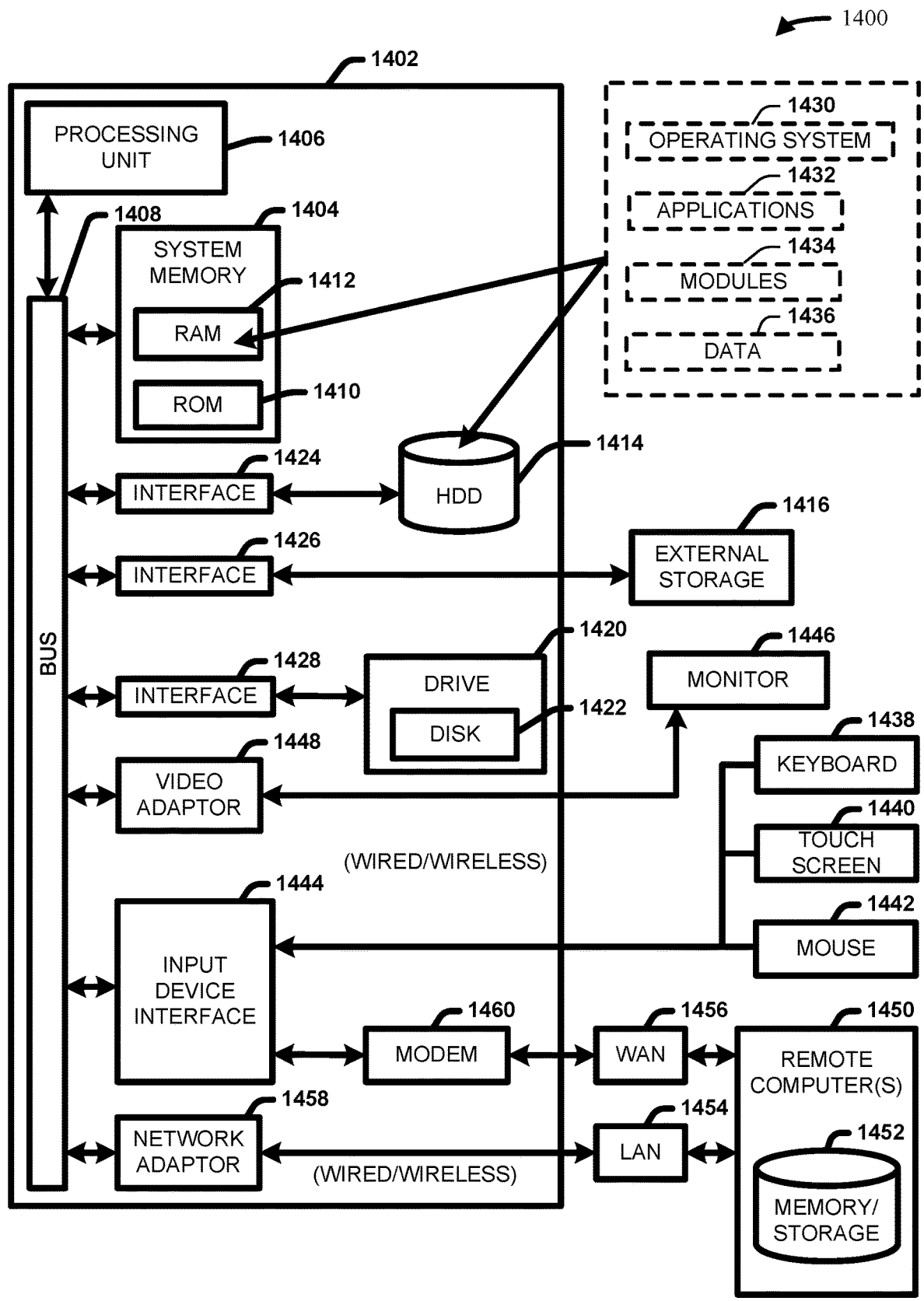
FIG. 14 illustrates a block diagram of an example, non-limiting operating environment in which one or more embodiments described herein can be facilitated.
Figure 15:
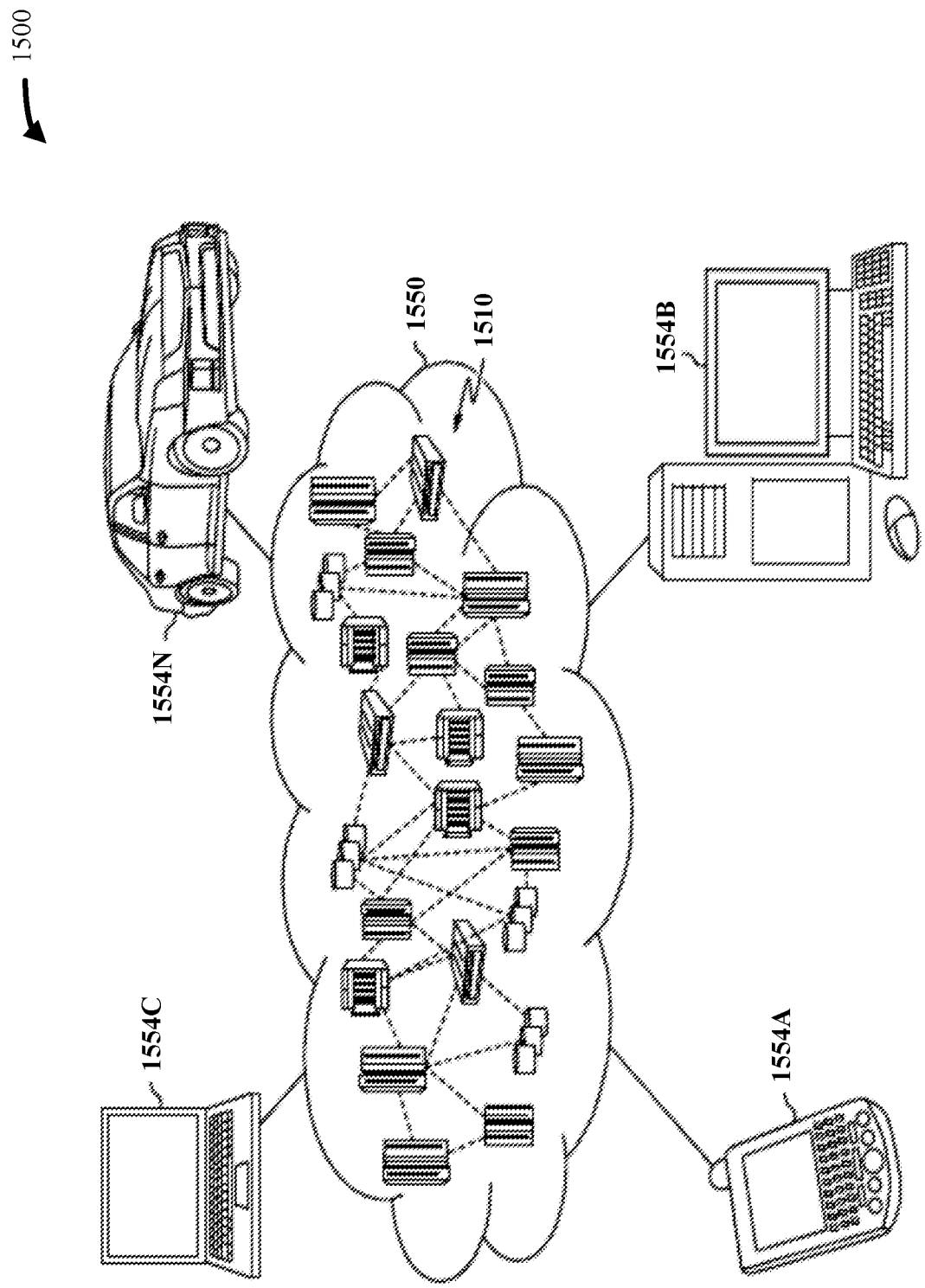
FIG. 15 illustrates a block diagram of an example, non-limiting cloud computing environment in accordance with one or more embodiments described herein.
Figure 16:
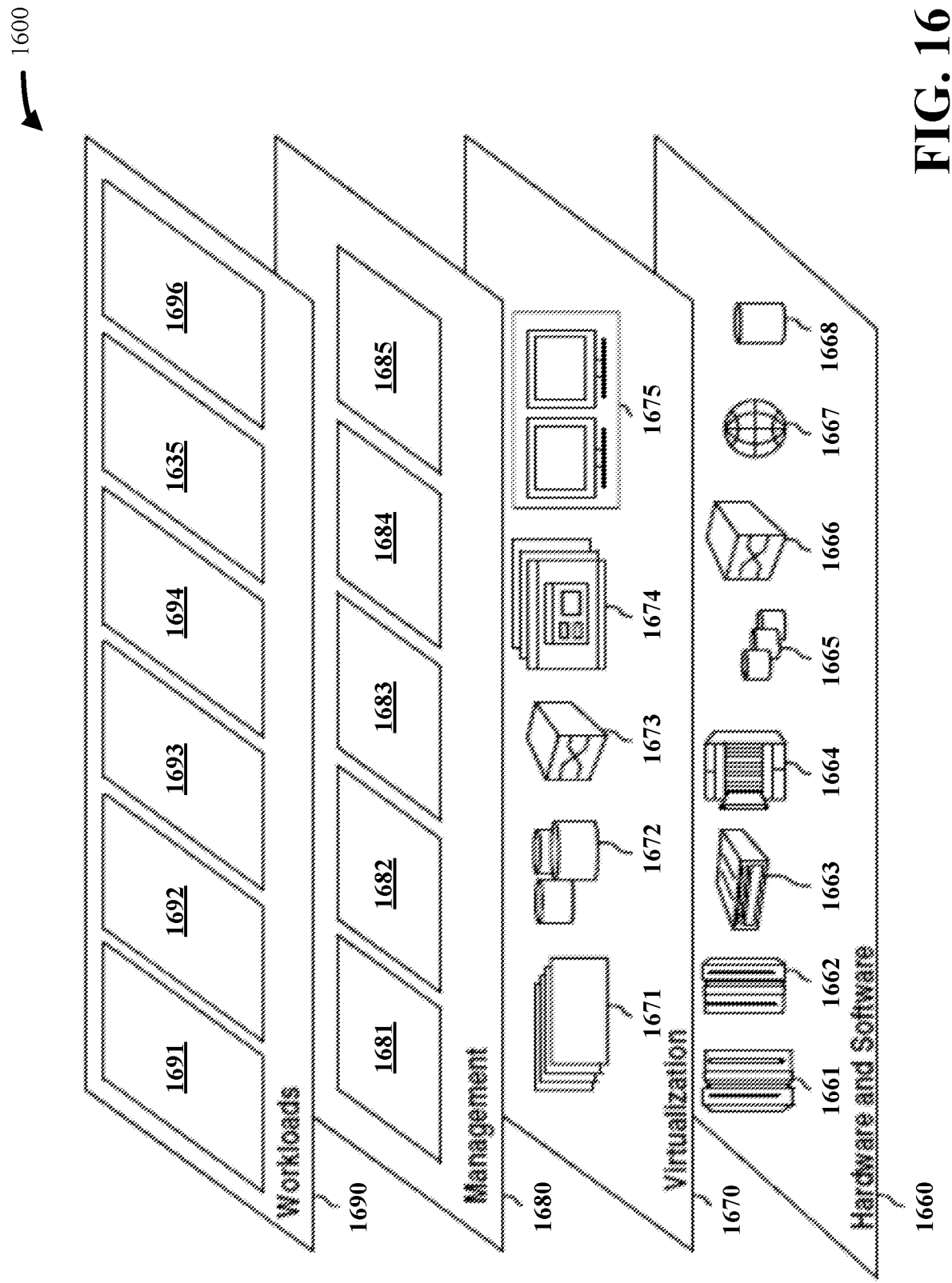
FIG. 16 illustrates a block diagram of a plurality of example, non-limiting abstraction model layers, in accordance with one or more embodiments described herein.

Turning next to FIGS. 14-16, a detailed description is provided of additional context for the one or more embodiments described herein at FIGS. 1-13.

FIG. 14 and the following discussion are intended to provide a brief, general description of a suitable operating environment 1400 in which one or more embodiments described herein at FIGS. 1-13 can be implemented. For example, one or more components and/or other aspects of embodiments described herein can be implemented in or be associated with, such as accessible via, the operating environment 1400. Further, while one or more embodiments have been described above in the general context of computer-executable instructions that can run on one or more computers, those skilled in the art will recognize that one or more embodiments also can be implemented in combination with other program modules and/or as a combination of hardware and software.

Generally, program modules include routines, programs, components, data structures and/or the like, that perform particular tasks and/or implement particular abstract data types. Moreover, those skilled in the art will appreciate that the inventive methods can be practiced with other computer system configurations, including single-processor or multi-processor computer systems, minicomputers, mainframe computers, Internet of Things (IoT) devices, distributed computing systems, as well as personal computers, handheld computing devices, microprocessor-based or programmable consumer electronics, and/or the like, each of which can be operatively coupled to one or more associated devices.

Computing devices typically include a variety of media, which can include computer-readable storage media, machine-readable storage media and/or communications media, which two terms are used herein differently from one another as follows. Computer-readable storage media or machine-readable storage media can be any available storage media that can be accessed by the computer and includes both volatile and nonvolatile media, removable and non-removable media. By way of example, but not limitation, computer-readable storage media and/or machine-readable storage media can be implemented in connection with any method or technology for storage of information such as computer-readable and/or machine-readable instructions, program modules, structured data and/or unstructured data.

Computer-readable storage media can include, but are not limited to, random access memory (RAM), read only memory (ROM), electrically erasable programmable read only memory (EEPROM), flash memory or other memory technology, compact disk read only memory (CD ROM), digital versatile disk (DVD), Blu-ray disc (BD) and/or other optical disk storage, magnetic cassettes, magnetic tape, magnetic disk storage and/or other magnetic storage devices, solid state drives or other solid state storage devices and/or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory and/or computer-readable media that are not only propagating transitory signals per se.

Computer-readable storage media can be accessed by one or more local or remote computing devices, e.g., via access requests, queries and/or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, but not limitation, communication media can include wired media, such as a wired network, direct-wired connection and/or wireless media such as acoustic, RF, infrared and/or other wireless media.

With reference again to FIG. 14, the example operating environment 1400 for implementing one or more embodiments of the aspects described herein can include a computer 1402, the computer 1402 including a processing unit 1406, a system memory 1404 and/or a system bus 1408. It will be appreciated that one or more aspects of the system memory 1404 or processing unit 1406 can be applied to memories such as 104, 304 and/or 404 and/or to processors such as 106, 306 and/or 406, respectively of the non-limiting systems 100, 300 and/or 400. It also will be appreciated that the system memory 1404 can be implemented in combination with and/or alternatively to memories such as 104, 304 and/or 404. Likewise, it also will be appreciated that the processing unit 1406 can be implemented in combination with and/or alternatively to processors such as 106, 306 and/or 406.

Memory 1404 can store one or more computer and/or machine readable, writable and/or executable components and/or instructions that, when executed by processing unit 1406 (e.g., a classical processor, a quantum processor and/or like processor), can facilitate performance of operations defined by the executable component(s) and/or instruction(s). For example, memory 1404 can store computer and/or machine readable, writable and/or executable components and/or instructions that, when executed by processing unit 1406, can facilitate execution of the one or more functions described herein relating to non-limiting systems 100, 300 and/or 400 and/or request facilitation systems such as 102, 202, 302 and/or 402, as described herein with or without reference to the one or more figures of the one or more embodiments.

Memory 1404 can comprise volatile memory (e.g., random access memory (RAM), static RAM (SRAM), dynamic RAM (DRAM) and/or the like) and/or non-volatile memory (e.g., read only memory (ROM), programmable ROM (PROM), electrically programmable ROM (EPROM), electrically erasable programmable ROM (EEPROM) and/or the like) that can employ one or more memory architectures.

Processing unit 1406 can comprise one or more types of processors and/or electronic circuitry (e.g., a classical processor, a quantum processor and/or like processor) that can implement one or more computer and/or machine readable, writable and/or executable components and/or instructions that can be stored at memory 1404. For example, processing unit 1406 can perform one or more operations that can be specified by computer and/or machine readable, writable and/or executable components and/or instructions including, but not limited to, logic, control, input/output (I/O), arithmetic and/or the like. In one or more embodiments, processing unit 1406 can be any of one or more commercially available processors. In one or more embodiments, processing unit 1406 can comprise one or more central processing unit, multi-core processor, microprocessor, dual microprocessors, microcontroller, System on a Chip (SOC), array processor, vector processor, quantum processor and/or another type of processor. The examples of processing unit 1406 can be employed to implement one or more embodiments described herein.

The system bus 1408 can couple system components including, but not limited to, the system memory 1404 to the processing unit 1406. The system bus 1408 can comprise one or more types of bus structure that can further interconnect to a memory bus (with or without a memory controller), a peripheral bus and/or a local bus using one or more of a variety of commercially available bus architectures. The system memory 1404 can include ROM 1410 and/or RAM 1412. A basic input/output system (BIOS) can be stored in a non-volatile memory such as ROM, erasable programmable read only memory (EPROM) and/or EEPROM, which BIOS contains the basic routines that help to transfer information among elements within the computer 1402, such as during startup. The RAM 1412 can include a high-speed RAM, such as static RAM for caching data.

The computer 1402 can include an internal hard disk drive (HDD) 1414 (e.g., EIDE, SATA), one or more external storage devices 1416 (e.g., a magnetic floppy disk drive (FDD), a memory stick or flash drive reader, a memory card reader and/or the like) and/or a drive 1420, e.g., such as a solid state drive or an optical disk drive, which can read or write from a disk 1422, such as a CD-ROM disc, a DVD, a BD and/or the like. Additionally and/or alternatively, where a solid state drive is involved, disk 1422 could not be included, unless separate. While the internal HDD 1414 is illustrated as located within the computer 1402, the internal HDD 1414 can also be configured for external use in a suitable chassis (not shown). Additionally, while not shown in operating environment 1400, a solid state drive (SSD) can be used in addition to, or in place of, an HDD 1414. The HDD 1414, external storage device(s) 1416 and drive 1420 can be connected to the system bus 1408 by an HDD interface 1424, an external storage interface 1426 and a drive interface 1428, respectively. The HDD interface 1424 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1402, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, can also be used in the example operating environment, and/or that any such storage media can contain computer-executable instructions for performing the methods described herein.

A number of program modules can be stored in the drives and RAM 1412, including an operating system 1430, one or more applications 1432, other program modules 1434 and/or program data 1436. All or portions of the operating system, applications, modules and/or data can also be cached in the RAM 1412. The systems and/or methods described herein can be implemented utilizing one or more commercially available operating systems and/or combinations of operating systems.

Computer 1402 can optionally comprise emulation technologies. For example, a hypervisor (not shown) or other intermediary can emulate a hardware environment for operating system 1430, and the emulated hardware can optionally be different from the hardware illustrated in FIG. 14. In a related embodiment, operating system 1430 can comprise one virtual machine (VM) of multiple VMs hosted at computer 1402. Furthermore, operating system 1430 can provide runtime environments, such as the JAVA runtime environment or the .NET framework, for applications 1432. Runtime environments are consistent execution environments that can allow applications 1432 to run on any operating system that includes the runtime environment. Similarly, operating system 1430 can support containers, and applications 1432 can be in the form of containers, which are lightweight, standalone, executable packages of software that include, e.g., code, runtime, system tools, system libraries and/or settings for an application.

Further, computer 1402 can be enabled with a security module, such as a trusted processing module (TPM). For instance, with a TPM, boot components hash next in time boot components and wait for a match of results to secured values before loading a next boot component. This process can take place at any layer in the code execution stack of computer 1402, e.g., applied at application execution level and/or at operating system (OS) kernel level, thereby enabling security at any level of code execution.

An entity can enter and/or transmit commands and/or information into the computer 1402 through one or more wired/wireless input devices, e.g., a keyboard 1438, a touch screen 1440 and/or a pointing device, such as a mouse 1442. Other input devices (not shown) can include a microphone, an infrared (IR) remote control, a radio frequency (RF) remote control and/or other remote control, a joystick, a virtual reality controller and/or virtual reality headset, a game pad, a stylus pen, an image input device, e.g., camera (s), a gesture sensor input device, a vision movement sensor input device, an emotion or facial detection device, a biometric input device, e.g., fingerprint and/or iris scanner, and/or the like. These and other input devices can be connected to the processing unit 1406 through an input device interface 1444 that can be coupled to the system bus 1408, but can be connected by other interfaces, such as a parallel port, an IEEE 1394 serial port, a game port, a USB port, an IR interface, a BLUETOOTH® interface and/or the like.

A monitor 1446 or other type of display device can be alternatively and/or additionally connected to the system bus 1408 via an interface, such as a video adapter 1448. In addition to the monitor 1446, a computer typically includes other peripheral output devices (not shown), such as speakers, printers and/or the like.

The computer 1402 can operate in a networked environment using logical connections via wired and/or wireless communications to one or more remote computers, such as a remote computer(s) 1450. The remote computer(s) 1450 can be a workstation, a server computer, a router, a personal computer, portable computer, microprocessor-based entertainment appliance, a peer device and/or other common network node, and typically includes many or all of the elements described relative to the computer 1402, although, for purposes of brevity, only a memory/storage device 1452 is illustrated. Additionally and/or alternatively, the computer 1402 can be coupled (e.g., communicatively, electrically, operatively, optically and/or the like) to one or more external systems, sources and/or devices (e.g., classical and/or quantum computing devices, communication devices and/or like device) via a data cable (e.g., High-Definition Multimedia Interface (HDMI), recommended standard (RS) 232, Ethernet cable and/or the like).

In one or more embodiments, a network can comprise one or more wired and/or wireless networks, including, but not limited to, a cellular network, a wide area network (WAN) (e.g., the Internet), or a local area network (LAN). For example, one or more embodiments described herein can communicate with one or more external systems, sources and/or devices, for instance, computing devices (and vice versa) using virtually any desired wired or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol and/or other proprietary and/or non-proprietary communication protocols. In a related example, one or more embodiments described herein can include hardware (e.g., a central processing unit (CPU), a transceiver, a decoder, quantum hardware, a quantum processor and/or the like), software (e.g., a set of threads, a set of processes, software in execution, quantum pulse schedule, quantum circuit, quantum gates and/or the like) and/or a combination of hardware and/or software that facilitates communicating information among one or more embodiments described herein and external systems, sources and/or devices (e.g., computing devices, communication devices and/or the like).

The logical connections depicted include wired/wireless connectivity to a local area network (LAN) 1454 and/or larger networks, e.g., a wide area network (WAN) 1456. LAN and WAN networking environments can be commonplace in offices and companies and can facilitate enterprise-wide computer networks, such as intranets, all of which can connect to a global communications network, e.g., the Internet.

When used in a LAN networking environment, the computer 1402 can be connected to the local network 1454 through a wired and/or wireless communication network interface or adapter 1458. The adapter 1458 can facilitate wired and/or wireless communication to the LAN 1454, which can also include a wireless access point (AP) disposed thereon for communicating with the adapter 1458 in a wireless mode.

When used in a WAN networking environment, the computer 1402 can include a modem 1460 and/or can be connected to a communications server on the WAN 1456 via other means for establishing communications over the WAN 1456, such as by way of the Internet. The modem 1460, which can be internal and/or external and a wired and/or wireless device, can be connected to the system bus 1408 via the input device interface 1444. In a networked environment, program modules depicted relative to the computer 1402 or portions thereof can be stored in the remote memory/storage device 1452. It will be appreciated that the network connections shown are merely exemplary and one or more other means of establishing a communications link among the computers can be used.

When used in either a LAN or WAN networking environment, the computer 1402 can access cloud storage systems or other network-based storage systems in addition to, and/or in place of, external storage devices 1416 as described above, such as but not limited to, a network virtual machine providing one or more aspects of storage and/or processing of information. Generally, a connection between the computer 1402 and a cloud storage system can be established over a LAN 1454 or WAN 1456 e.g., by the adapter 1458 or modem 1460, respectively. Upon connecting the computer 1402 to an associated cloud storage system, the external storage interface 1426 can, such as with the aid of the adapter 1458 and/or modem 1460, manage storage provided by the cloud storage system as it would other types of external storage. For instance, the external storage interface 1426 can be configured to provide access to cloud storage sources as if those sources were physically connected to the computer 1402.

The computer 1402 can be operable to communicate with any wireless devices and/or entities operatively disposed in wireless communication, e.g., a printer, scanner, desktop and/or portable computer, portable data assistant, communications satellite, telephone and/or any piece of equipment or location associated with a wirelessly detectable tag (e.g., a kiosk, news stand, store shelf and/or the like). This can include Wireless Fidelity (Wi-Fi) and BLUETOOTH® wireless technologies. Thus, the communication can be a predefined structure as with a conventional network or simply an ad hoc communication between at least two devices.

The illustrated embodiments described herein can be practiced in distributed computing environments (e.g., cloud computing environments), such as described below with respect to FIG. 15, where certain tasks are performed by remote processing devices that are linked through a communications network. In a distributed computing environment, program modules can be located both in local and/or remote memory storage devices.

For example, one or more embodiments described herein and/or one or more components thereof can employ one or more computing resources of the cloud computing environment 1550 described below with reference to FIG. 15, and/or with reference to the one or more functional abstraction layers (e.g., quantum software and/or the like) described below with reference to FIG. 16, to execute one or more operations in accordance with one or more embodiments described herein. For example, cloud computing environment 1550 and/or one or more of the functional abstraction layers 1660, 1670, 1680 and/or 1690 can comprise one or more classical computing devices (e.g., classical computer, classical processor, virtual machine, server and/or the like), quantum hardware and/or quantum software (e.g., quantum computing device, quantum computer, quantum processor, quantum circuit simulation software, superconducting circuit and/or the like) that can be employed by one or more embodiments described herein and/or components thereof to execute one or more operations in accordance with one or more embodiments described herein. For instance, one or more embodiments described herein and/or components thereof can employ such one or more classical and/or quantum computing resources to execute one or more classical and/or quantum: mathematical function, calculation and/or equation; computing and/or processing script; algorithm; model (e.g., artificial intelligence (AI) model, machine learning (ML) model and/or like model); and/or other operation in accordance with one or more embodiments described herein.

It is to be understood that although one or more embodiments described herein include a detailed description on cloud computing, implementation of the teachings recited herein are not limited to a cloud computing environment. Rather, one or more embodiments described herein are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can specify location at a higher level of abstraction (e.g., country, state and/or datacenter).

Rapid elasticity: capabilities can be rapidly and elastically provisioned, in one or more cases automatically, to quickly scale out and rapidly released to quickly scale in. To the consumer, the capabilities available for provisioning can appear to be unlimited and can be purchased in any quantity at any time.

Measured service: cloud systems automatically control and optimize resource use by leveraging a metering capability at one or more levels of abstraction appropriate to the type of service (e.g., storage, processing, bandwidth and/or active user accounts). Resource usage can be monitored, controlled and/or reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage and/or individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems and/or storage, but has control over the deployed applications and possibly application hosting environment configurations.

Infrastructure as a Service (IaaS): the capability provided to the consumer is to provision processing, storage, networks and/or other fundamental computing resources where the consumer can deploy and run arbitrary software, which can include operating systems and applications. The consumer does not manage or control the underlying cloud infrastructure but has control over operating systems, storage, deployed applications and/or possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy and/or compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community or public) that remain unique entities but are bound together by standardized or proprietary technology that enables data and application portability (e.g., cloud bursting for load-balancing among clouds).

A cloud computing environment is service oriented with a focus on statelessness, low coupling, modularity and/or semantic interoperability. At the heart of cloud computing is an infrastructure that includes a network of interconnected nodes.

Moreover, the non-limiting systems 100, 300 and/or 400 and/or the example operating environment 1400 can be associated with and/or be included in a data analytics system, a data processing system, a graph analytics system, a graph processing system, a big data system, a social network system, a speech recognition system, an image recognition system, a graphical modeling system, a bioinformatics system, a data compression system, an artificial intelligence system, an authentication system, a syntactic pattern recognition system, a medical system, a health monitoring system, a network system, a computer network system, a communication system, a router system, a server system, a high availability server system (e.g., a Telecom server system), a Web server system, a file server system, a data server system, a disk array system, a powered insertion board system, a cloud-based system and/or the like. In accordance therewith, non-limiting systems 100, 300 and/or 400 and/or example operating environment 1400 can be employed to use hardware and/or software to solve problems that are highly technical in nature, that are not abstract and/or that cannot be performed as a set of mental acts by a human.

Referring now to details of one or more aspects illustrated at FIG. 15, the illustrative cloud computing environment 1550 is depicted. As shown, cloud computing environment 1550 includes one or more cloud computing nodes 1510 with which local computing devices used by cloud consumers, such as, for example, personal digital assistant (PDA) or cellular telephone 1554A, desktop computer 1554B, laptop computer 1554C and/or automobile computer system 1554N can communicate. Although not illustrated in FIG. 15, cloud computing nodes 1510 can further comprise a quantum platform (e.g., quantum computer, quantum hardware, quantum software and/or the like) with which local computing devices used by cloud consumers can communicate. Cloud computing nodes 1510 can communicate with one another. They can be grouped (not shown) physically or virtually, in one or more networks, such as Private, Community, Public, or Hybrid clouds as described hereinabove, or a combination thereof. This allows cloud computing environment 1550 to offer infrastructure, platforms and/or software as services for which a cloud consumer does not need to maintain resources on a local computing device. It is understood that the types of computing devices 1554A-N shown in FIG. 15 are intended to be illustrative only and that cloud computing nodes 1510 and cloud computing environment 1550 can communicate with any type of computerized device over any type of network and/or network addressable connection (e.g., using a web browser).

Referring now to details of one or more aspects illustrated at FIG. 16, a set 1600 of functional abstraction layers is shown, such as provided by cloud computing environment 1550 (FIG. 15). One or more embodiments described herein can be associated with, such as accessible via, one or more functional abstraction layers described below with reference to FIG. 16 (e.g., hardware and software layer 1660, virtualization layer 1670, management layer 1680 and/or workloads layer 1690). It should be understood in advance that the components, layers and/or functions shown in FIG. 16 are intended to be illustrative only and embodiments described herein are not limited thereto. As depicted, the following layers and/or corresponding functions are provided:

Hardware and software layer 1660 can include hardware and software components. Examples of hardware components include: mainframes 1661; RISC (Reduced Instruction Set Computer) architecture-based servers 1662; servers 1663; blade servers 1664; storage devices 1665; and/or networks and/or networking components 1666. In one or more embodiments, software components can include network application server software 1667, quantum platform routing software 1668; and/or quantum software (not illustrated in FIG. 16).

Virtualization layer 1670 can provide an abstraction layer from which the following examples of virtual entities can be provided: virtual servers 1671; virtual storage 1672; virtual networks 1673, including virtual private networks; virtual applications and/or operating systems 1674; and/or virtual clients 1675.

In one example, management layer 1680 can provide the functions described below. Resource provisioning 1681 can provide dynamic procurement of computing resources and other resources that can be utilized to perform tasks within the cloud computing environment. Metering and Pricing 1682 can provide cost tracking as resources are utilized within the cloud computing environment, and/or billing and/or invoicing for consumption of these resources. In one example, these resources can include one or more application software licenses. Security can provide identity verification for cloud consumers and/or tasks, as well as protection for data and/or other resources. User (or entity) portal 1683 can provide access to the cloud computing environment for consumers and system administrators. Service level management 1684 can provide cloud computing resource allocation and/or management such that required service levels are met. Service Level Agreement (SLA) planning and fulfillment 1685 can provide pre-arrangement for, and procurement of, cloud computing resources for which a future requirement is anticipated in accordance with an SLA.

Workloads layer 1690 can provide examples of functionality for which the cloud computing environment can be utilized. Non-limiting examples of workloads and functions which can be provided from this layer include: mapping and navigation 1691; software development and lifecycle management 1692; virtual classroom education delivery 1693; data analytics processing 1694; transaction processing 1695; and/or application transformation software 1696.

The embodiments described herein can be directed to one or more of a system, a method, an apparatus and/or a computer program product at any possible technical detail level of integration. The computer program product can include a computer readable storage medium (or media) having computer readable program instructions thereon for causing a processor to carry out aspects of the one or more embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device and/or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon and/or any suitable combination of the foregoing. A computer readable storage medium, as used herein, is not to be construed as being transitory signals per se, such as radio waves and/or other freely propagating electromagnetic waves, electromagnetic waves propagating through a waveguide and/or other transmission media (e.g., light pulses passing through a fiber-optic cable), and/or electrical signals transmitted through a wire.

Computer readable program instructions described herein can be downloaded to respective computing/processing devices from a computer readable storage medium and/or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the one or more embodiments described herein can be assembler instructions, instruction-set-architecture (ISA) instructions, machine instructions, machine dependent instructions, microcode, firmware instructions, state-setting data, configuration data for integrated circuitry, and/or source code and/or object code written in any combination of one or more programming languages, including an object oriented programming language such as Smalltalk, C++ or the like, and/or procedural programming languages, such as the "C" programming language and/or similar programming languages. The computer readable program instructions can execute entirely on a computer, partly on a computer, as a stand-alone software package, partly on a computer and/or partly on a remote computer or entirely on the remote computer and/or server. In the latter scenario, the remote computer can be connected to a computer through any type of network, including a local area network (LAN) and/or a wide area network (WAN), and/or the connection can be made to an external computer (for example, through the Internet using an Internet Service Provider). In one or more embodiments, electronic circuitry including, for example, programmable logic circuitry, field-programmable gate arrays (FPGA) and/or programmable logic arrays (PLA) can execute the computer readable program instructions by utilizing state information of the computer readable program instructions to personalize the electronic circuitry, in order to perform aspects of the one or more embodiments described herein.

Aspects of the one or more embodiments described herein are described with reference to flowchart illustrations and/or block diagrams of methods, apparatus (systems), and computer program products according to one or more embodiments described herein. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer and/or other programmable data processing apparatus to produce a machine, such that the instructions, which execute via the processor of the computer or other programmable data processing apparatus, can create means for implementing the functions/acts specified in the flowchart and/or block diagram block or blocks. These computer readable program instructions can also be stored in a computer readable storage medium that can direct a computer, a programmable data processing apparatus and/or other devices to function in a particular manner, such that the computer readable storage medium having instructions stored therein can comprise an article of manufacture including instructions which can implement aspects of the function/act specified in the flowchart and/or block diagram block or blocks. The computer readable program instructions can also be loaded onto a computer, other programmable data processing apparatus and/or other device to cause a series of operational acts to be performed on the computer, other programmable apparatus and/or other device to produce a computer implemented process, such that the instructions which execute on the computer, other programmable apparatus and/or other device implement the functions/acts specified in the flowchart and/or block diagram block or blocks.

The flowcharts and block diagrams in the figures illustrate the architecture, functionality and/or operation of possible implementations of systems, computer-implementable methods and/or computer program products according to one or more embodiments described herein. In this regard, each block in the flowchart or block diagrams can represent a module, segment and/or portion of instructions, which comprises one or more executable instructions for implementing the specified logical function(s). In one or more alternative implementations, the functions noted in the blocks can occur out of the order noted in the Figures. For example, two blocks shown in succession can be executed substantially concurrently, and/or the blocks can sometimes be executed in the reverse order, depending upon the functionality involved. It will also be noted that each block of the block diagrams and/or flowchart illustration, and/or combinations of blocks in the block diagrams and/or flowchart illustration, can be implemented by special purpose hardware-based systems that can perform the specified functions and/or acts and/or carry out one or more combinations of special purpose hardware and/or computer instructions.

While the subject matter has been described above in the general context of computer-executable instructions of a computer program product that runs on a computer and/or computers, those skilled in the art will recognize that the one or more embodiments herein also can be implemented in combination with one or more other program modules. Generally, program modules include routines, programs, components, data structures and/or the like that perform particular tasks and/or implement particular abstract data types. Moreover, those skilled in the art will appreciate that the inventive computer-implemented methods can be practiced with other computer system configurations, including single-processor and/or multiprocessor computer systems, mini-computing devices, mainframe computers, as well as computers, hand-held computing devices (e.g., PDA, phone), microprocessor-based or programmable consumer and/or industrial electronics and/or the like. The illustrated aspects can also be practiced in distributed computing environments in which tasks are performed by remote processing devices that are linked through a communications network. However, one or more, if not all aspects of the one or more embodiments described herein can be practiced on stand-alone computers. In a distributed computing environment, program modules can be located in both local and remote memory storage devices.

As used in this application, the terms "component," "system," "platform," "interface," and/or the like, can refer to and/or can include a computer-related entity or an entity related to an operational machine with one or more specific functionalities. The entities described herein can be either hardware, a combination of hardware and software, software, or software in execution. For example, a component can be, but is not limited to being, a process running on a processor, a processor, an object, an executable, a thread of execution, a program and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system and/or across a network such as the Internet with other systems via the signal). As another example, a component can be an apparatus with specific functionality provided by mechanical parts operated by electric or electronic circuitry, which is operated by a software and/or firmware application executed by a processor. In such a case, the processor can be internal and/or external to the apparatus and can execute at least a part of the software and/or firmware application. As yet another example, a component can be an apparatus that provides specific functionality through electronic components without mechanical parts, where the electronic components can include a processor and/or other means to execute software and/or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter described herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit and/or device comprising, but not limited to, single-core processors; single-processors with software multithread execution capability; multi-core processors; multi-core processors with software multithread execution capability; multi-core processors with hardware multithread technology; parallel platforms; and/or parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, and/or any combination thereof designed to perform the functions described herein. Further, processors can exploit nano-scale architectures such as, but not limited to, molecular and quantum-dot based transistors, switches and/or gates, in order to optimize space usage and/or to enhance performance of related equipment. A processor can be implemented as a combination of computing processing units.

Herein, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory and/or nonvolatile random access memory (RAM) (e.g., ferroelectric RAM (FeRAM). Volatile memory can include RAM, which can act as external cache memory, for example. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM) and/or Rambus dynamic RAM (RDRAM). Additionally, the described memory components of systems and/or computer-implemented methods herein are intended to include, without being limited to including, these and/or any other suitable types of memory.

What has been described above includes mere examples of systems and computer-implemented methods. It is, of course, not possible to describe every conceivable combination of components and/or computer-implemented methods for purposes of describing the one or more embodiments, but one of ordinary skill in the art can recognize that many further combinations and/or permutations of the one or more embodiments are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the one or more embodiments have been presented for purposes of illustration but are not intended to be exhaustive or limited to the embodiments described herein. Many modifications and variations will be apparent to those of ordinary skill in the art without departing from the scope and spirit of the described embodiments. The terminology used herein was chosen to best explain the principles of the embodiments, the practical application and/or technical improvement over technologies found in the marketplace, and/or to enable others of ordinary skill in the art to understand the embodiments described herein.

What is claimed is:
1. A system, comprising:
   a processor that executes computer executable components stored in memory, wherein the computer executable components comprise:

a services component that:
  operates a service for a transaction, wherein different portions of the transaction are operated on by respective services of a group of services components in a sequential order, and the group of services components comprise the services component; and
  implements a portion of a consensus protocol to determine consensus regarding a request to initiate the transaction by communicating one or more messages, in relation to determining the consensus regarding the request, only with one or more other services components of the group or services components that operate one or more other services in the sequential order immediately upstream or downstream of the service.

2. The system of claim 1, wherein the services component, in response to sending a message downstream to a first services component immediately downstream in the sequential order, waits for a response from the first services component before sending a vote of the services component to a second services component immediately upstream in the sequential order.

3. The system of claim 1, wherein the services component approaches consensus regarding the request absent global management of communications among the group of services components.

4. The system of claim 1, wherein the one or more messages comprise at least one of the request, a vote or a final decision.

5. The system of claim 4, wherein the services component:
  propagates a first message comprising the request or one or more secondary requests toward a first subgroup of the group of services components that perform a first subset of the respective services downstream in the sequential order from the service;
  propagates a second message comprising one or more votes to accept or to abort the request or the one or more secondary requests toward a second subgroup of the group of services components that perform a second subset of the respective services upstream in the sequential order from the service; and
  propagates a third message comprising a final decision regarding the consensus toward the second subgroup of the group of services components.

6. The system of claim 1, wherein the services component comprises:
  a log component that maintains, for the services component, an individual durable log of only message communications in which the individual services component participated.

7. The system of claim 1, wherein the executable components further comprise:
  an observation component that facilitates observation by an administrating entity of communications among the group of services components as the communications occur.

8. A computer-implemented method, comprising:
  operating, by a service component of a system operatively coupled to a processor, a service for a transaction, wherein different portions of the transaction are operated on by respective services of a group of services components in a sequential order, and the group of services components comprise the services component; and
  implementing, by the services component, a portion of a consensus protocol to determine consensus regarding a request to initiate the transaction by communicating one or more messages, in relation to determining the consensus regarding the request, only with one or more other services components of the group or services components that operate one or more other services in the sequential order immediately upstream or downstream of the service.

9. The computer-implemented method of claim 8, further comprising:
  in response to sending a message downstream to a first services component immediately downstream in the sequential order, waiting, by the services component, for a response from the first services component before sending a vote of the services component to a second services component immediately upstream in the sequential order.

10. The computer-implemented method of claim 8, further comprising:
  approaching consensus, by the services component, regarding the request absent global management of communications among the group of services components.

11. The computer-implemented method of claim 8, wherein the one or more messages comprise at least one of the request, a vote or a final decision.

12. The computer-implemented method of claim 11, further comprising:
  propagating, by the services component, a first message comprising the request or one or more secondary requests toward a first subgroup of the group of services components that perform a first subset of the respective services downstream in the sequential order from the service;
  propagating, by the services component, a second message comprising one or more votes to accept or to abort the request or the one or more secondary requests toward a second subgroup of the group of services components that perform a second subset of the respective services upstream in the sequential order from the service; and
  propagating, by the services component, a third message comprising a final decision regarding the consensus toward the second subgroup of the group of services components.

13. The computer-implemented method of claim 8, further comprising:
  maintaining, by the services component, an individual durable log of only message communications in which the services component participated.

14. The computer-implemented method of claim 8, further comprising:
  facilitating, by the system, observation, by an administrating entity, of communications among the group of services components as the communications occur.

15. A computer program product facilitating a process for consensus regarding a request to execute a transaction, the computer program product comprising a non-transitory computer readable medium having program instructions embodied therewith, the program instructions executable by a processor to cause the processor to:
  operate, by a services component, a service for the transaction, wherein different portions of the transaction are operated on by respective services of a group of services components in a sequential order, and the group of services components comprise the services component; and implement, by the services component, a portion of a consensus protocol to determine the consensus regarding the request to execute the transaction by communicating one or more messages, in relation to determining the consensus regarding the request, only with one or more other services components of the group or services components that operate one or more other services in the sequential order immediately upstream or downstream of the service.

16. The computer program product of claim 15, wherein the program instructions are further executable by a processor to cause the processor to:

in response to sending a message downstream to a first services component immediately downstream in the sequential order, wait, by the services component, for a response from the first services component before sending a vote of the services component to a second services component immediately upstream in the sequential order.

17. The computer program product of claim 15, wherein the program instructions are further executable by a processor to cause the processor to:

approach consensus, by the services component, regarding the request absent global management of communications among the group of services components.

18. The computer program product of claim 15, wherein the one or more messages comprise at least one of the request, a vote or a final decision.

19. The computer program product of claim 18, wherein the program instructions are further executable by a processor to cause the processor to:

propagate, by the services component, a second message comprising one or more votes to accept or to abort the request or the one or more secondary requests toward a second subgroup of the group of services components that perform a second subset of the respective services upstream in the sequential order from the service; and propagate, by the services component, a second message comprising one or more votes to accept or to abort the request or the one or more secondary requests toward a second subgroup of the group of services components that perform a second subset of the respective services upstream in the sequential order from the service; and propagate, by the services component, a third message comprising a final decision regarding the consensus toward the second subgroup of the group of services components.

20. The computer program product of claim 15, wherein the program instructions are further executable by a processor to cause the processor to:

maintain, by the services component, an individual durable log of only message communications in which the services component participated.

* * * * *